United States Patent [19]
Fukasawa

[11] Patent Number: 5,329,403
[45] Date of Patent: Jul. 12, 1994

[54] IMAGE READING LENS
[75] Inventor: Motomu Fukasawa, Tokyo, Japan
[73] Assignee: Canon Kabushiki Kaisha, Tokyo, Japan
[21] Appl. No.: 69,852
[22] Filed: Jun. 1, 1993

[30] Foreign Application Priority Data
Jun. 9, 1992 [JP] Japan .................. 4-176278

[51] Int. Cl.⁵ .............................. G02B 13/18
[52] U.S. Cl. .................. 359/717; 359/739; 359/795
[58] Field of Search .......... 359/717, 795, 739

[56] References Cited
U.S. PATENT DOCUMENTS
3,014,407 12/1961 Altman .................... 359/717
4,755,039 7/1988 Hattori ..................... 359/795

FOREIGN PATENT DOCUMENTS
89128028 5/1989 Japan .
163509 7/1991 Japan .................... 359/717

Primary Examiner—Scott J. Sugarman
Attorney, Agent, or Firm—Fitzpatrick, Cella, Harper & Scinto

[57] ABSTRACT

An image reading lens that is constructed of, in succession from the object side, a stop, a meniscus-shaped positive first lens having its convex surface at the image plane side, and a negative second lens having its concave surface at the image plane side. Both the lens surfaces of the first lens and at least one lens surface of the second lens are constructed of an aspherical surface. The shape of the object side aspherical surface of the first lens is formed so as to be inside a reference spherical surface.

6 Claims, 20 Drawing Sheets

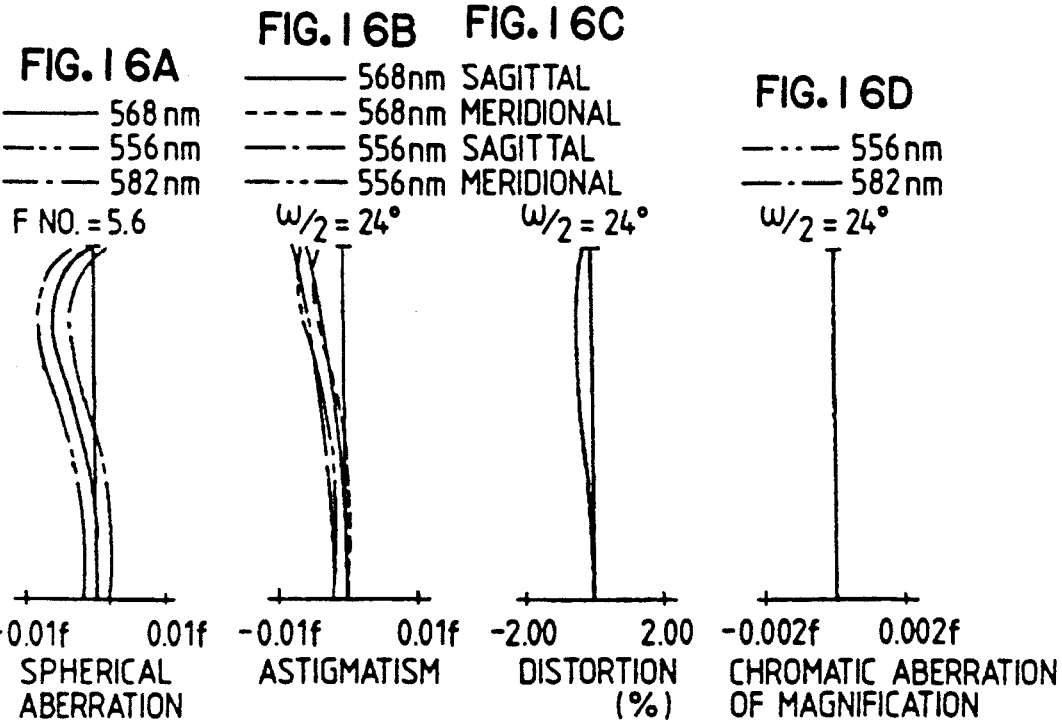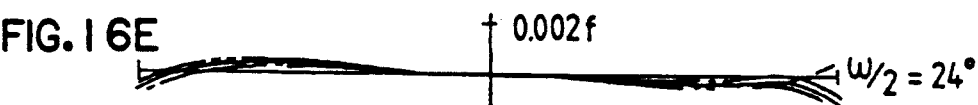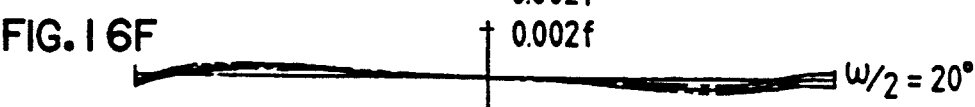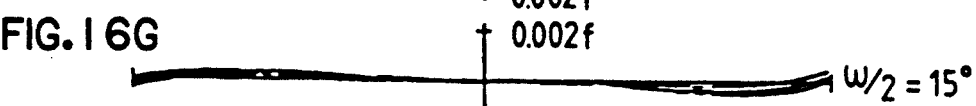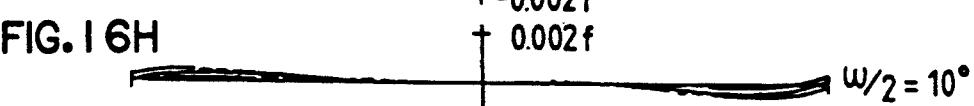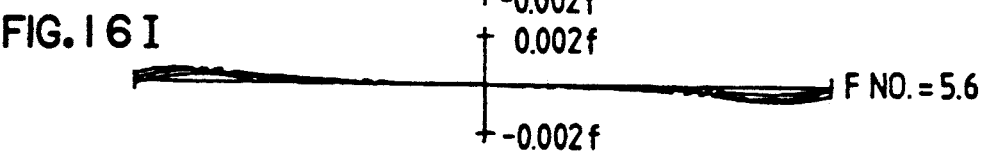

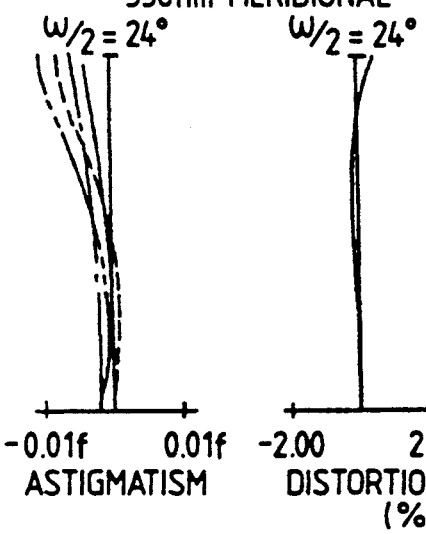
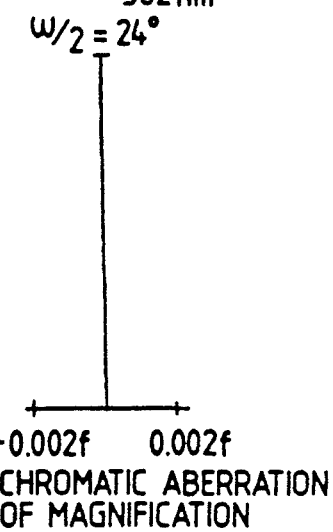
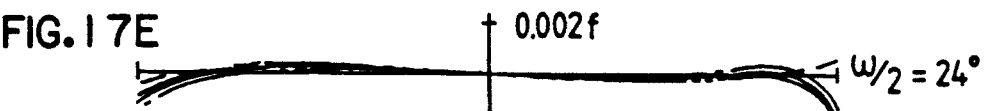
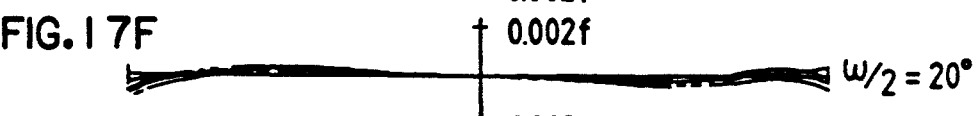
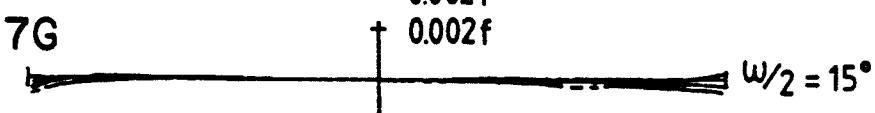
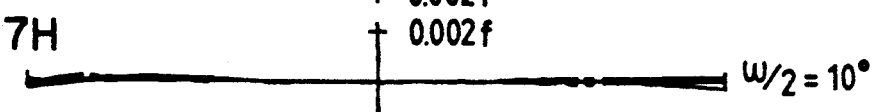
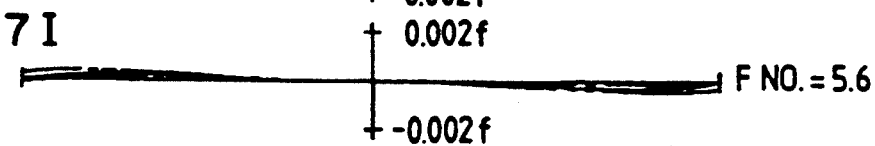

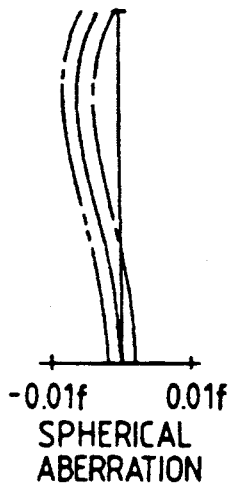
FIG. 18A
——— 568 nm
—··— 556 nm
—·— 582 nm
F NO.=5.6
-0.01f  0.01f
SPHERICAL
ABERRATION
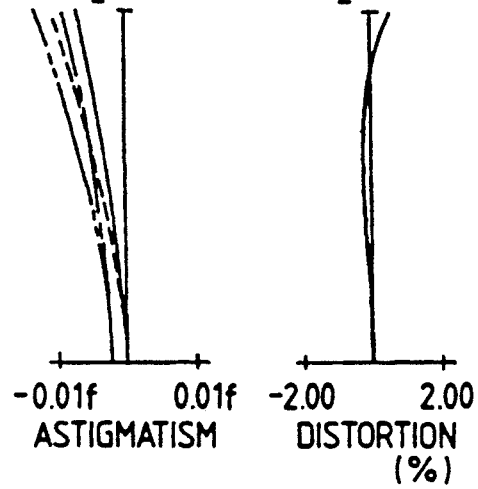
FIG. 18B
——— 568nm SAGITTAL
----- 568nm MERIDIONAL
—··— 556nm SAGITTAL
—··— 556nm MERIDIONAL
ω/2 = 24°
-0.01f  0.01f
ASTIGMATISM
FIG. 18C
ω/2 = 24°
-2.00  2.00
DISTORTION (%)
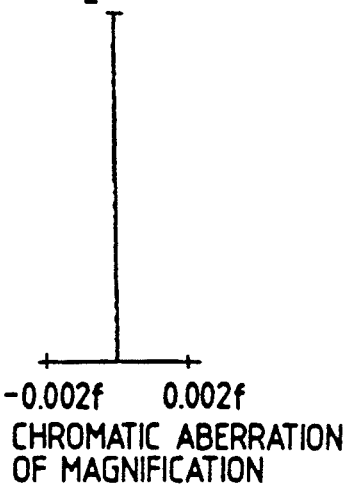
FIG. 18D
—··— 556nm
—·— 582nm
ω/2 = 24°
-0.002f  0.002f
CHROMATIC ABERRATION
OF MAGNIFICATION
FIG. 18E
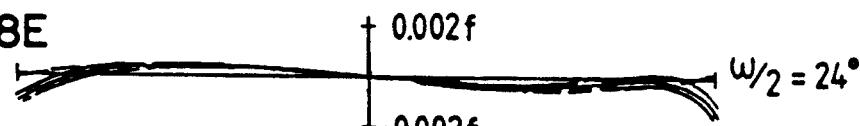
ω/2 = 24°
FIG. 18F
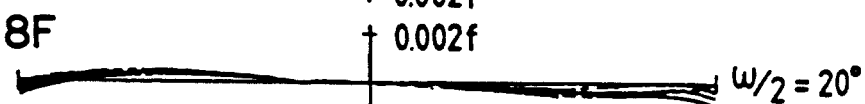
ω/2 = 20°
FIG. 18G
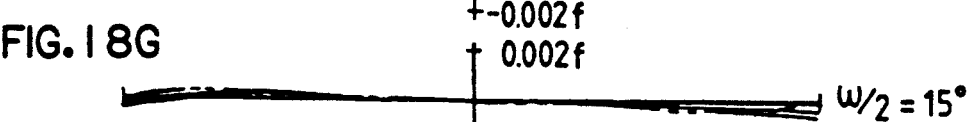
ω/2 = 15°
FIG. 18H
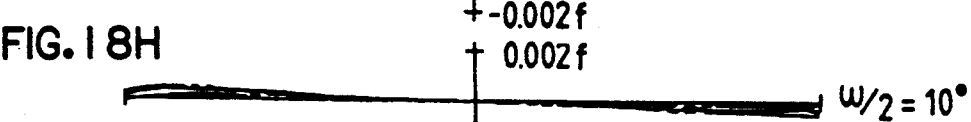
ω/2 = 10°
FIG. 18I
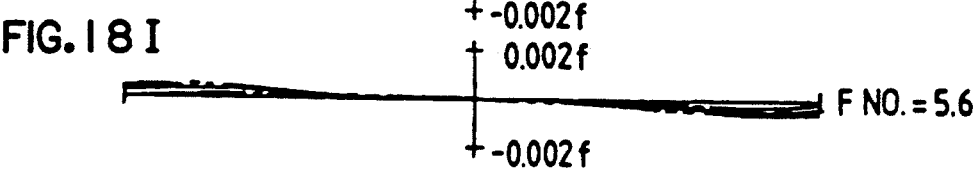
F NO.=5.6
——— 568nm MERIDIONAL
----- 568nm SAGITTAL
—··— 556nm MERIDIONAL
—·— 582nm MERIDIONAL

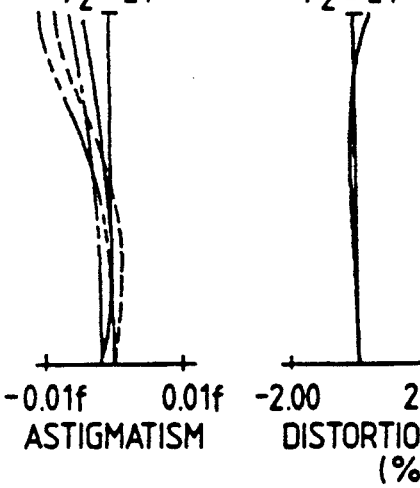
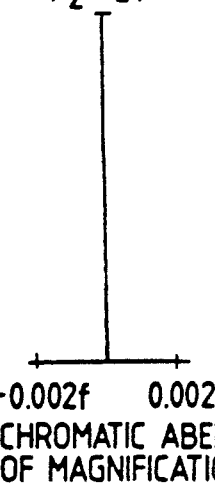
FIG. 19A — 568 nm, 556 nm, 582 nm, F NO. = 5.6, SPHERICAL ABERRATION, -0.01f to 0.01f
FIG. 19B — 568 nm SAGITTAL/MERIDIONAL, 556 nm SAGITTAL/MERIDIONAL, ω/2 = 24°, ASTIGMATISM, -0.01f to 0.01f
FIG. 19C — ω/2 = 24°, DISTORTION (%), -2.00 to 2.00
FIG. 19D — 556 nm, 582 nm, ω/2 = 24°, CHROMATIC ABERRATION OF MAGNIFICATION, -0.002f to 0.002f
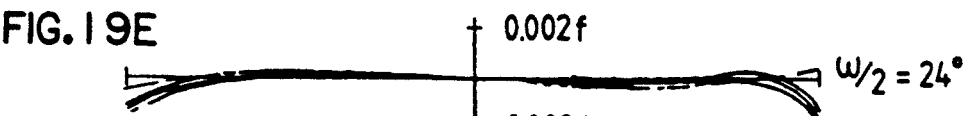
FIG. 19E — ω/2 = 24°
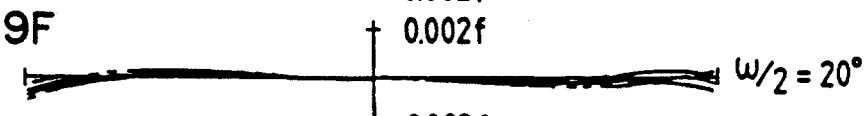
FIG. 19F — ω/2 = 20°
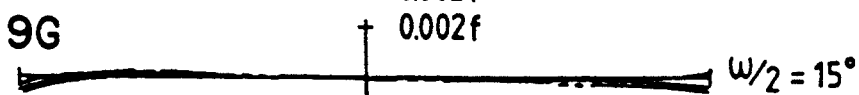
FIG. 19G — ω/2 = 15°
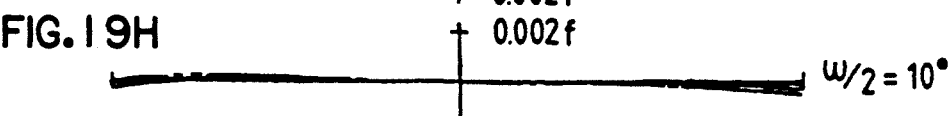
FIG. 19H — ω/2 = 10°
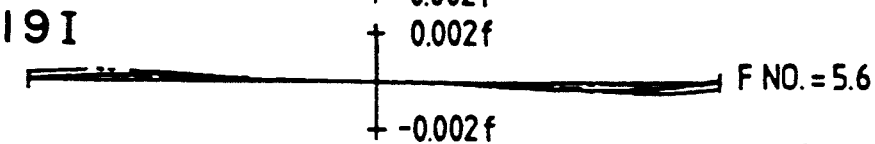
FIG. 19I — F NO. = 5.6
——— 568nm MERIDIONAL
- - - - 568nm SAGITTAL
—··— 556nm MERIDIONAL
—·— 582nm MERIDIONAL

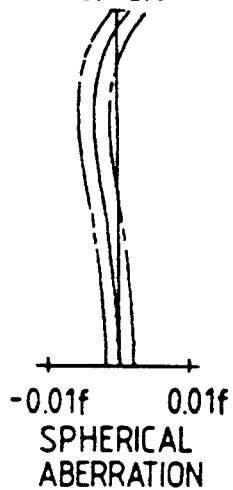
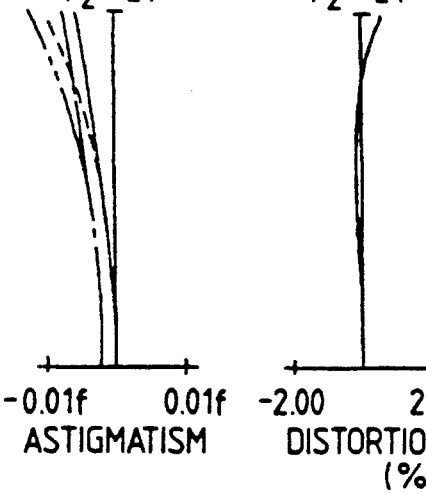
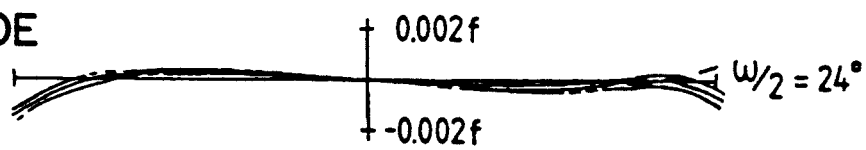
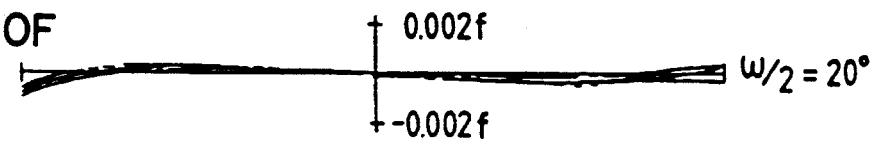
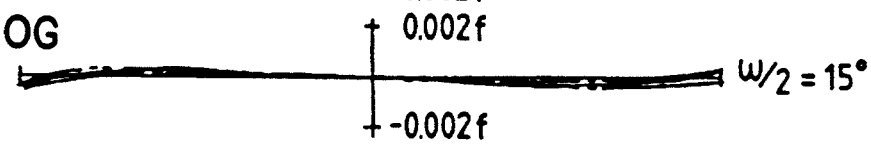
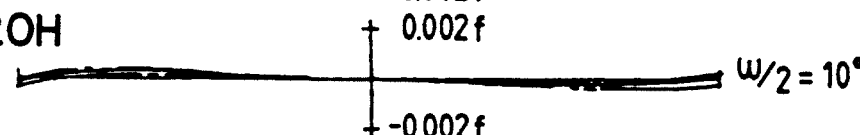
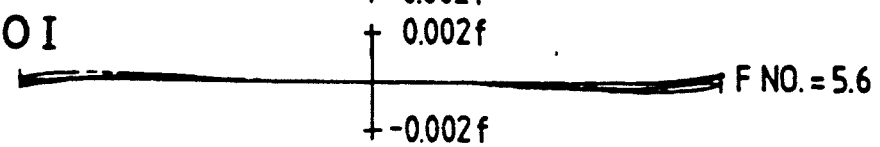

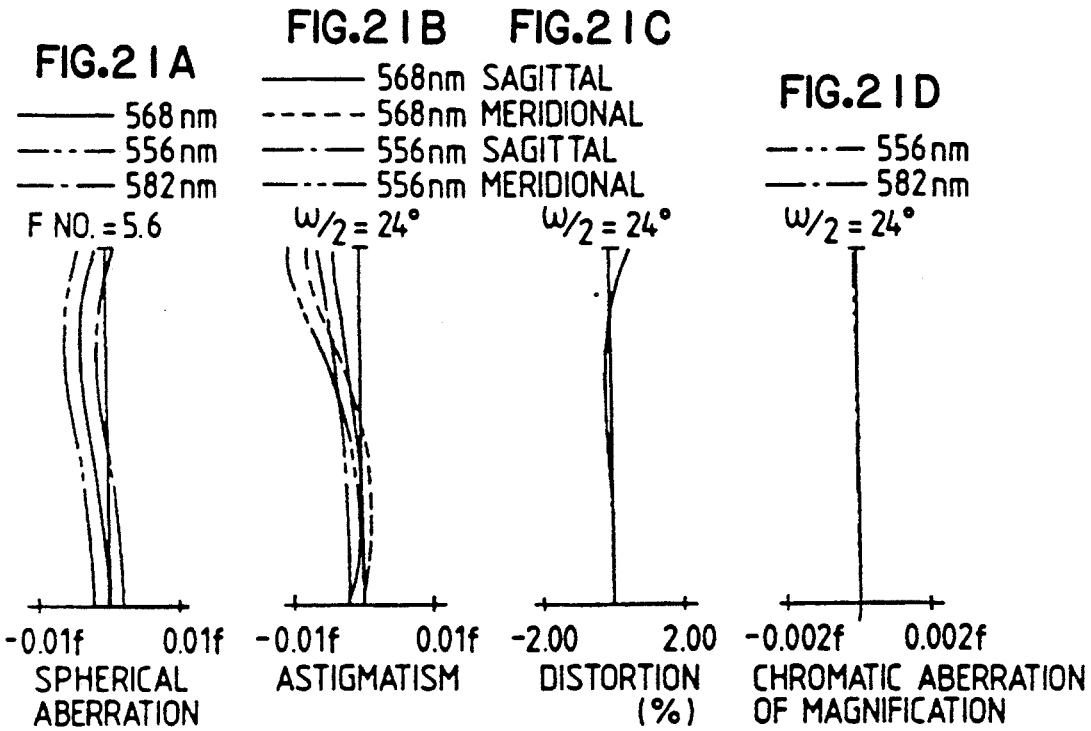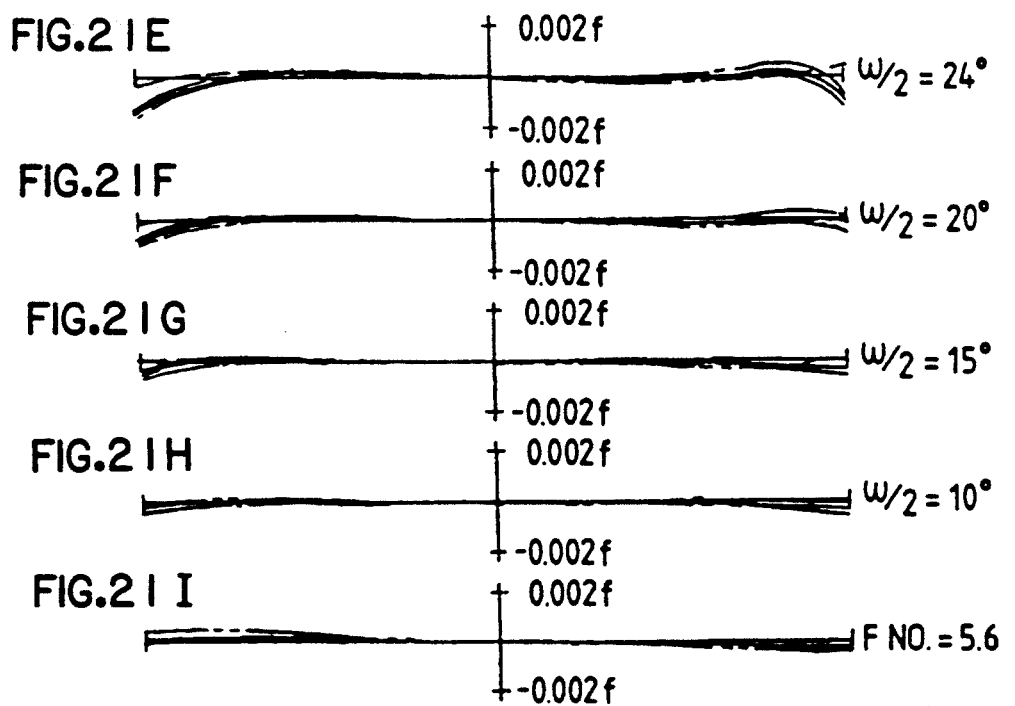

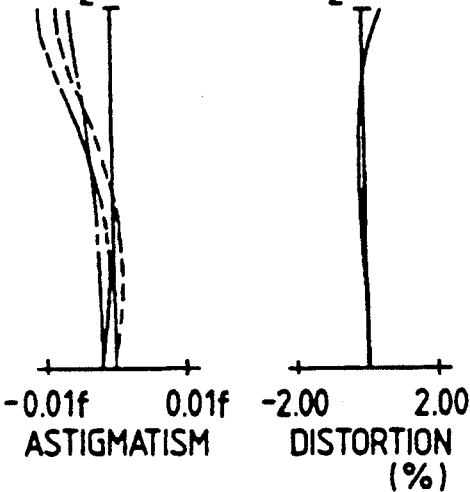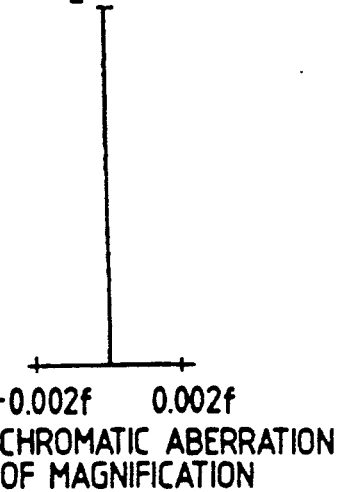
FIG.22A 568nm, 556nm, 582nm, F NO.=5.6, SPHERICAL ABERRATION
FIG.22B 568nm SAGITTAL, 568nm MERIDIONAL, 556nm SAGITTAL, 556nm MERIDIONAL, ω/2=24°, ASTIGMATISM
FIG.22C ω/2=24°, DISTORTION (%)
FIG.22D 556nm, 582nm, ω/2=24°, CHROMATIC ABERRATION OF MAGNIFICATION
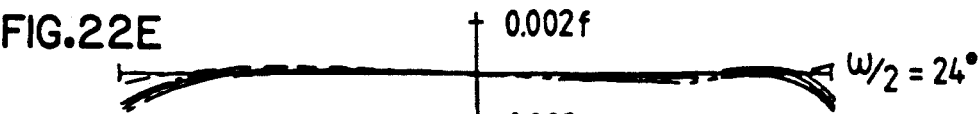
FIG.22E ω/2=24°
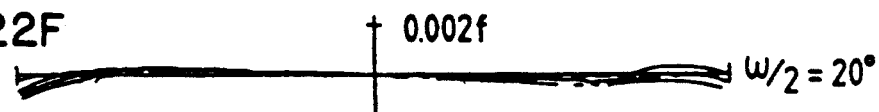
FIG.22F ω/2=20°
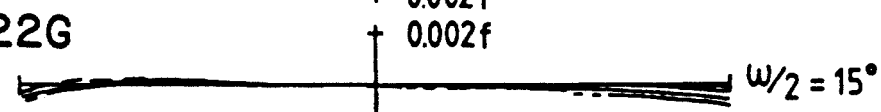
FIG.22G ω/2=15°
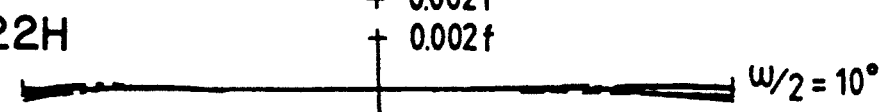
FIG.22H ω/2=10°
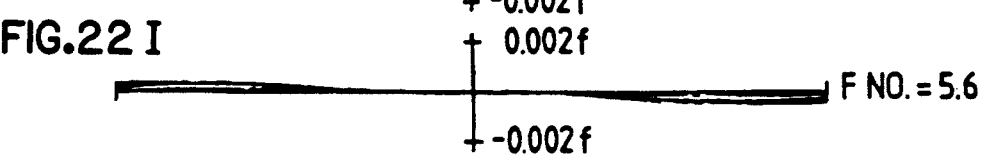
FIG.22 I  F NO.=5.6
— 568nm MERIDIONAL
----- 568nm SAGITTAL
—·— 556nm MERIDIONAL
—··— 582nm MERIDIONAL

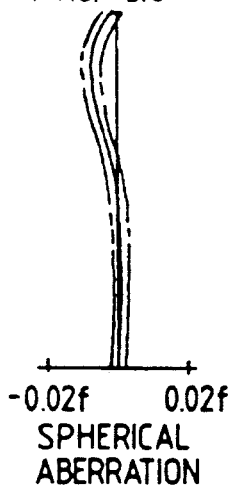
FIG.23A
——— 568 nm
—··— 556 nm
—·— 582 nm
F NO. = 5.6
-0.02f  0.02f
SPHERICAL ABERRATION
FIG.23B
——— 568nm SAGITTAL
----- 568nm MERIDIONAL
—··— 556nm SAGITTAL
—·— 556nm MERIDIONAL
ω/2 = 24°
-0.02f  0.02f
ASTIGMATISM
FIG.23C
ω/2 = 24°
-1.00  1.00
DISTORTION (%)
FIG.23D
—··— 556nm
—·— 582nm
ω/2 = 24°
-0.002f  0.002f
CHROMATIC ABERRATION OF MAGNIFICATION
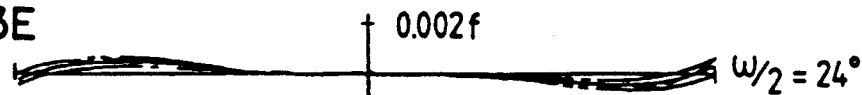
FIG.23E   ω/2 = 24°
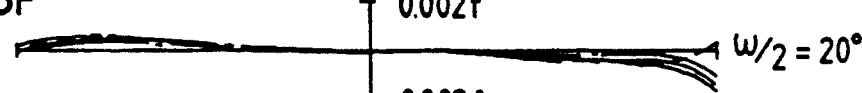
FIG.23F   ω/2 = 20°
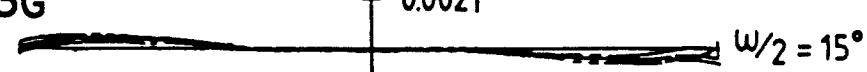
FIG.23G   ω/2 = 15°
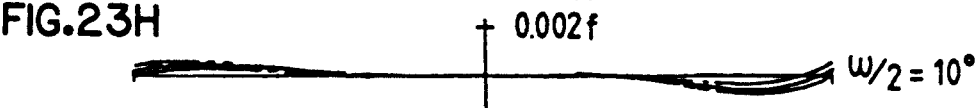
FIG.23H   ω/2 = 10°
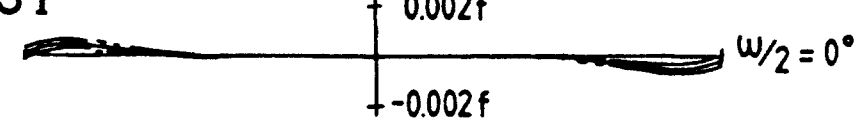
FIG.23I   ω/2 = 0°
——— 568nm MERIDIONAL
----- 568nm SAGITTAL
—··— 556nm MERIDIONAL
—·— 582nm MERIDIONAL

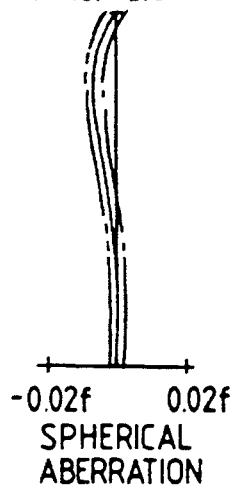
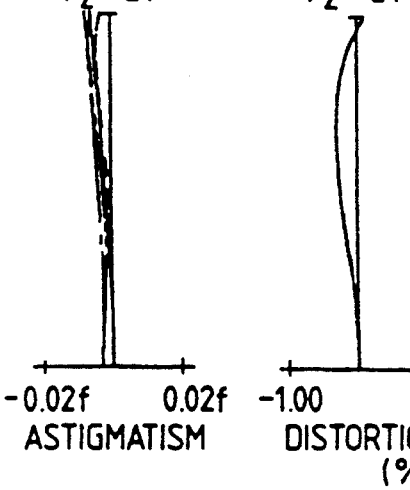
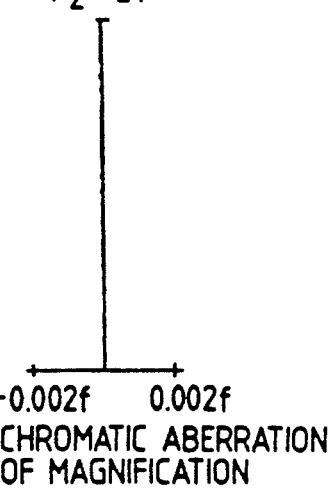
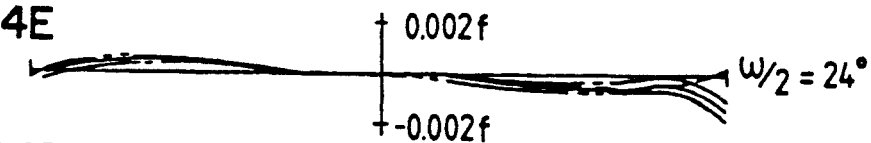
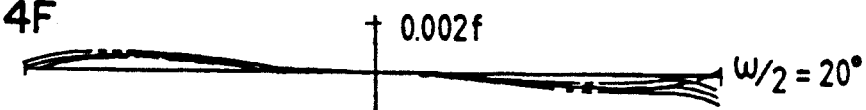
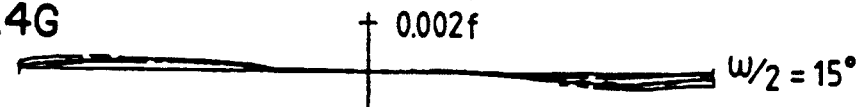
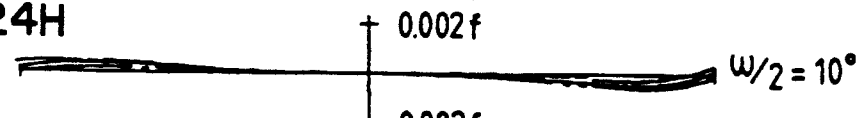
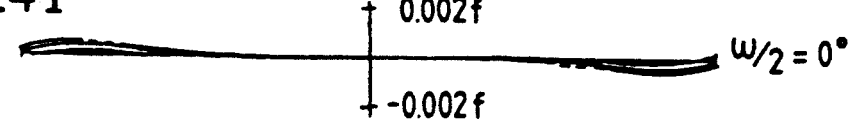

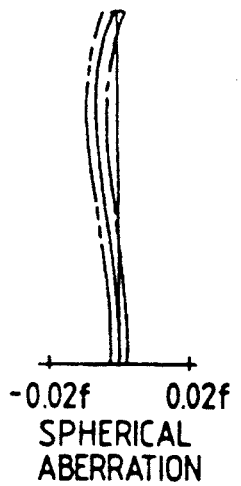
FIG.25A
—— 568 nm
—··— 556 nm
—·— 582 nm
F NO.=5.6
SPHERICAL ABERRATION
FIG.25B
—— 568nm SAGITTAL
----- 568nm MERIDIONAL
—··— 556nm SAGITTAL
—·— 556nm MERIDIONAL
$\omega/2 = 24°$
ASTIGMATISM
FIG.25C
$\omega/2 = 24°$
DISTORTION (%)
FIG.25D
—··— 556nm
—·— 582nm
$\omega/2 = 24°$
CHROMATIC ABERRATION OF MAGNIFICATION
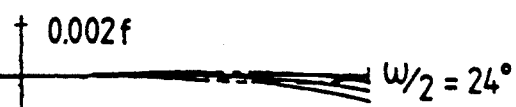
FIG.25E  $\omega/2 = 24°$
FIG.25F  $\omega/2 = 20°$
FIG.25G  $\omega/2 = 15°$
FIG.25H  $\omega/2 = 10°$
FIG.25 I  $\omega/2 = 0°$
—— 568nm MERIDIONAL
----- 568nm SAGITTAL
—··— 556nm MERIDIONAL
—·— 582nm MERIDIONAL

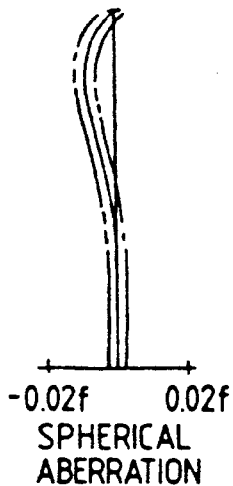
FIG.26A
—— 568nm
—··— 556nm
—·— 582nm
F NO. = 5.6
-0.02f  0.02f
SPHERICAL
ABERRATION
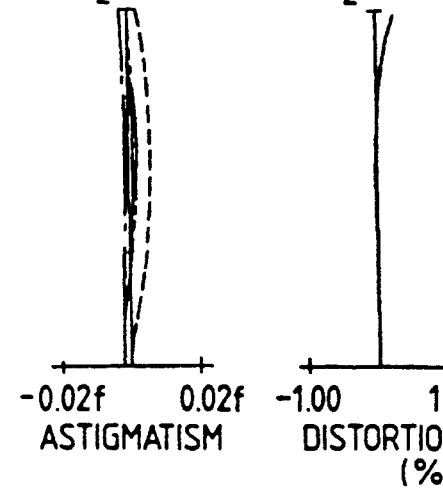
FIG.26B
—— 568nm SAGITTAL
----- 568nm MERIDIONAL
—·— 556nm SAGITTAL
—··— 556nm MERIDIONAL
ω/2 = 24°
-0.02f  0.02f
ASTIGMATISM
FIG.26C
ω/2 = 24°
-1.00  1.00
DISTORTION
(%)
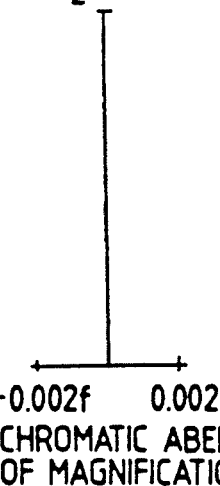
FIG.26D
—··— 556nm
—·— 582nm
ω/2 = 24°
-0.002f  0.002f
CHROMATIC ABERRATION
OF MAGNIFICATION
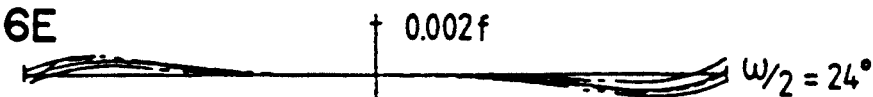
FIG.26E   ω/2 = 24°
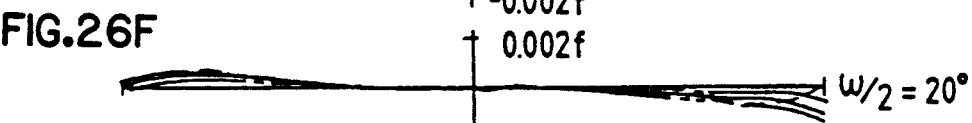
FIG.26F   ω/2 = 20°
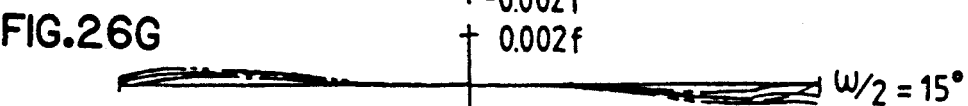
FIG.26G   ω/2 = 15°
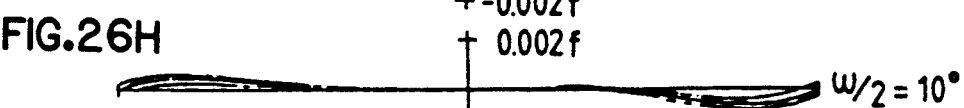
FIG.26H   ω/2 = 10°
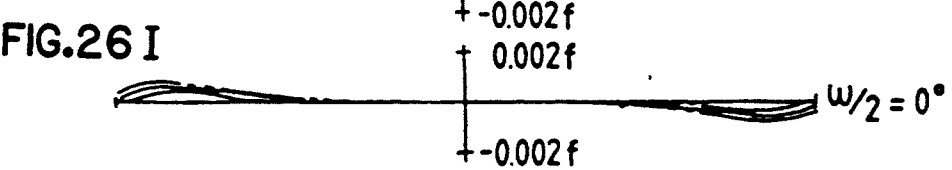
FIG.26 I   ω/2 = 0°
—— 568nm MERIDIONAL
----- 568nm SAGITTAL
—··— 556nm MERIDIONAL
—·— 582nm MERIDIONAL

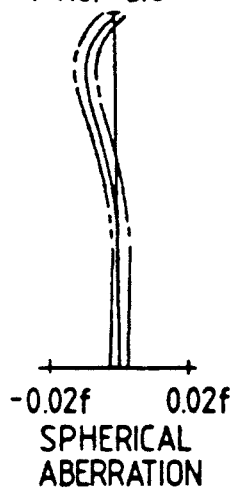
FIG.27A
——— 568nm
—··— 556nm
—·—  582nm
F NO.=5.6
SPHERICAL
ABERRATION
−0.02f   0.02f
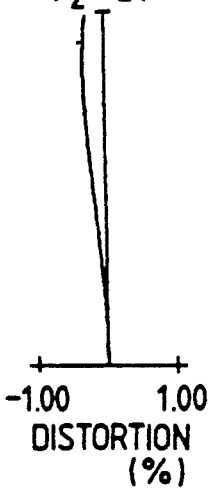
FIG.27B
——— 568nm SAGITTAL
----- 568nm MERIDIONAL
—··— 556nm SAGITTAL
—··— 556nm MERIDIONAL
ω/2 = 24°
ASTIGMATISM
−0.02f   0.02f
FIG.27C
ω/2 = 24°
DISTORTION (%)
−1.00   1.00
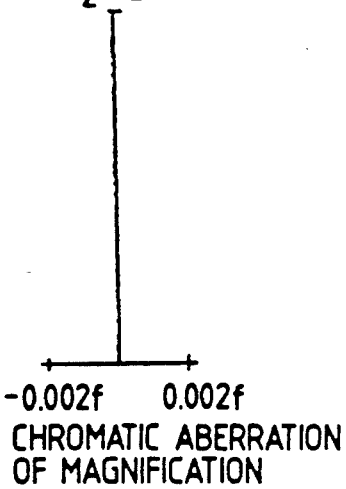
FIG.27D
—··— 556nm
—·— 582nm
ω/2 = 24°
CHROMATIC ABERRATION
OF MAGNIFICATION
−0.002f   0.002f
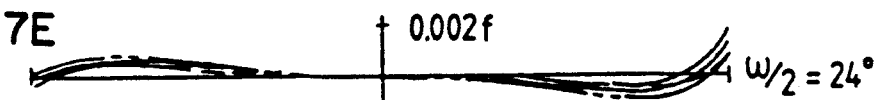
FIG.27E   ω/2 = 24°
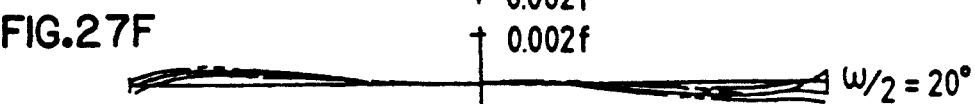
FIG.27F   ω/2 = 20°
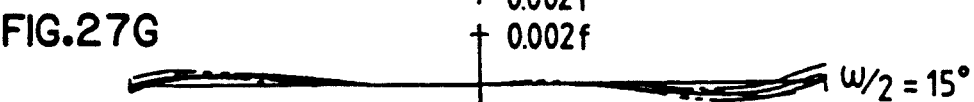
FIG.27G   ω/2 = 15°
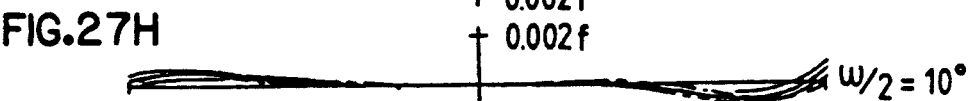
FIG.27H   ω/2 = 10°
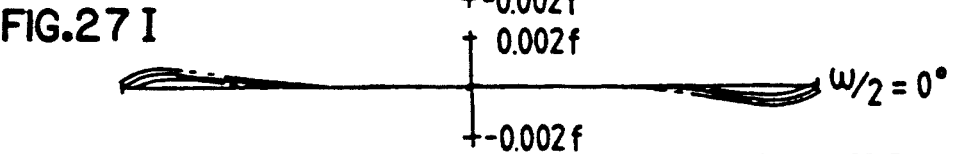
FIG.27I   ω/2 = 0°
——— 568nm MERIDIONAL
----- 568nm SAGITTAL
—··— 556nm MERIDIONAL
—·— 582nm MERIDIONAL ——— 568 nm
—··— 556 nm
—·— 582 nm
F NO. = 5.6
-0.02f   0.02f
SPHERICAL ABERRATION ——— 568nm SAGITTAL
----- 568nm MERIDIONAL
—··— 556nm SAGITTAL
—··— 556nm MERIDIONAL
ω/2 = 24°
-0.02f   0.02f
ASTIGMATISM

ω/2 = 24°
-1.00   1.00
DISTORTION (%)

—··— 556nm
—·— 582nm
ω/2 = 24°
-0.002f   0.002f
CHROMATIC ABERRATION OF MAGNIFICATION

ω/2 = 24°

ω/2 = 20°

ω/2 = 15°

ω/2 = 10°

ω/2 = 0°

——— 568nm MERIDIONAL
----- 568nm SAGITTAL
—··— 556nm MERIDIONAL
—·— 582nm MERIDIONAL

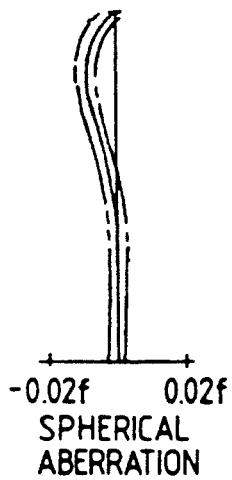
FIG.29A
——— 568 nm
—··— 556 nm
—·— 582 nm
F NO. = 5.6
-0.02f  0.02f
SPHERICAL
ABERRATION
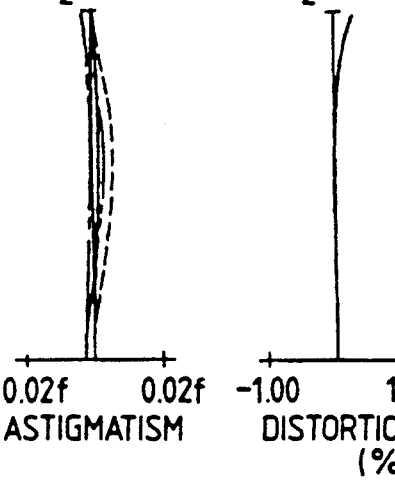
FIG.29B   FIG.29C
——— 568nm SAGITTAL
---- 568nm MERIDIONAL
—··— 556nm SAGITTAL
—·— 556nm MERIDIONAL
ω/2 = 24°        ω/2 = 24°
-0.02f  0.02f   -1.00   1.00
ASTIGMATISM     DISTORTION
                   (%)
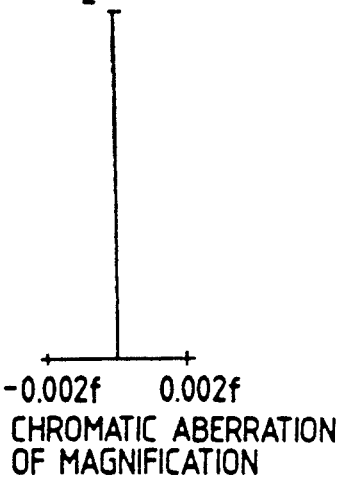
FIG.29D
—··— 556nm
—·— 582nm
ω/2 = 24°
-0.002f  0.002f
CHROMATIC ABERRATION
OF MAGNIFICATION
FIG.29E
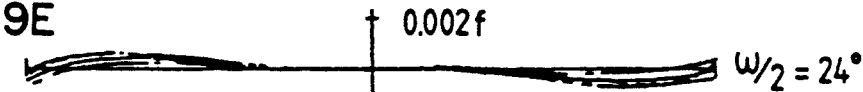
0.002f / -0.002f   ω/2 = 24°
FIG.29F
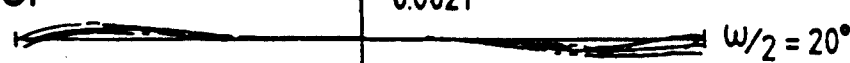
0.002f / -0.002f   ω/2 = 20°
FIG.29G
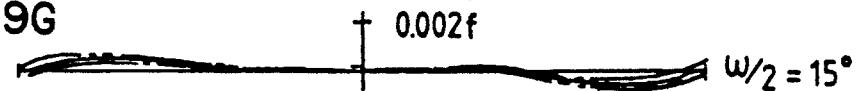
0.002f / -0.002f   ω/2 = 15°
FIG.29H
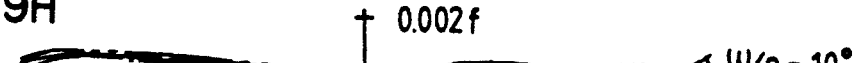
0.002f / -0.002f   ω/2 = 10°
FIG.29 I
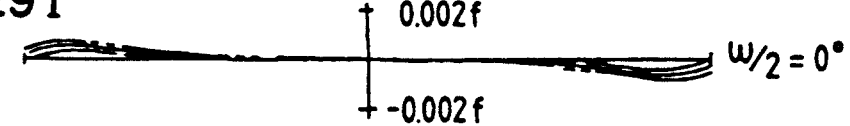
0.002f / -0.002f   ω/2 = 0°
——— 568nm MERIDIONAL
----- 568nm SAGITTAL
—··— 556nm MERIDIONAL
—·— 582nm MERIDIONAL

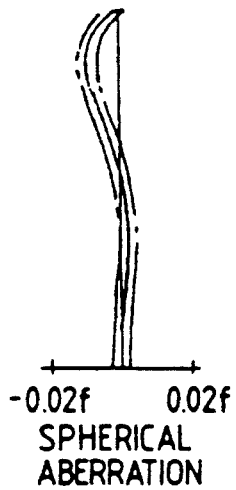

IMAGE READING LENS

BACKGROUND OF THE INVENTION

1. Field of the Invention

This invention relates to an image reading lens, and particularly to an image reading lens suitable for an apparatus such as a facsimile apparatus or an image scanner for causing image information on the surface of an original, which is illuminated by a light beam from illuminating means such as an LED array, to be formed on the surface of reading means such as an image sensor (CCD), and reading the image information.

2. Related Background Art

There have heretofore been proposed various apparatuses designed to cause image information on the surface of an original to be imaged on the surface of a solid state image pickup element array (line sensor) at a predetermined magnification by an image reading lens and then to read the image information. For example, as an apparatus designed to read image information by the use of an image reading lens having a resolving power corresponding to a scanning line density of 8 pel (pels/mm) or 200 dpi (dot/inch), there is an apparatus such as a facsimile apparatus or an image scanner.

An image reading lens having, for example, F number 5.6 and a half angle of view of the order of 22° has heretofore been used in such an apparatus.

Such an image reading lens is proposed, for example, in Japanese Laid-Open Patent Application No. 1-128028. In this publication, the image reading lens is comprised of a so-called triplet type lens comprising three lenses of predetermined shapes, i.e., in succession from the object side, a positive lens, a negative lens and a positive lens, and an aspherical surface is adopted as the image plane side lens surface of the negative lens to thereby achieve an improved optical performance.

Such an image reading lens as a whole is comprised of three lenses of predetermined shapes, and uses glass of high refractive index as the material of the lenses. An aspherical surface is adopted in one of the three lenses. This has led to the problem that the lens construction becomes complicated and relatively high assembly accuracy is required.

Now, in recent years, the tendency of a CCD (line sensor), which is a light receiving element, has advanced toward having a higher sensitivity and along therewith, the tendency of illuminating means (a light source) for illuminating an original (image) has advanced toward having a lower luminance.

As an example of this, there have been proposed various image reading apparatuses using as illuminating means an LED array comprising a plurality of LEDs (light emitting diodes) of simple construction and low cost arranged side by side, and utilizing this LED array to illuminate an image.

The spectral energy distribution of this LED array used as the illuminating means concentrates in a very narrow wavelength area. Therefore, it is important for an image reading lens, for reading image information on the surface of an original illuminated by a light beam from the illuminating means comprising such LED array, to correct various aberrations. In particular, the chromatic aberration of magnification must be corrected in a particularly narrow wavelength area, even better than in a conventional image reading lens that is directed to wide band spectral energy.

SUMMARY OF THE INVENTION

The present invention has as its object the provision of an image reading lens of simple construction, which is capable of reading image information on the surface of an original illuminated by a light beam from illuminating means such as an LED array, with various aberrations corrected in a well balanced manner and with a high optical performance, because of the lens construction thereof including the lens shape and the aspherical surface shape being appropriately set.

The image reading lens of the present invention has, in succession from the object side, a stop, a meniscus-shaped positive first lens having its convex surface facing the image plane side, and a negative second lens having its concave surface facing the image plane side, and is characterized in that the both lens surfaces of the first lens and at least one lens surface of the second lens each comprise an aspherical surface, and the shape of the aspherical surface of the first lens that is adjacent to the object side is formed so as to be the inside of a reference spherical surface.

BRIEF DESCRIPTION OF THE DRAWINGS

FIGS. 16A-16I show aberrations in numerical value example 1 of the present invention.

FIGS. 17A-17I show aberrations in numerical value example 2 of the present invention.

FIGS. 18A-18I show aberrations in numerical value example 3 of the present invention.

FIGS. 19A-19I show aberrations in numerical value example 4 of the present invention.

FIGS. 20A-20I show aberrations in numerical value example 5 of the present invention.

FIGS. 21A-21I show aberrations in numerical value example 6 of the present invention.

FIGS. 22A-22I show aberrations in numerical value example 7 of the present invention.

FIGS. 23A-23I show aberrations in numerical value example 8 of the present invention.

FIGS. 24A-24I show aberrations in numerical value example 9 of the present invention.

FIGS. 25A-25I show aberrations in numerical value example 10 of the present invention.

FIGS. 26A-26I show aberrations in numerical value example 11 of the present invention.

FIGS. 27A-27I show aberrations in numerical value example 12 of the present invention.

FIGS. 29A-29I show aberrations in numerical value example 14 of the present invention.

FIGS. 30A-30I show aberrations in numerical value example 15 of the present invention.

DETAILED DESCRIPTION OF THE PREFERRED EMBODIMENTS

Figure 1:
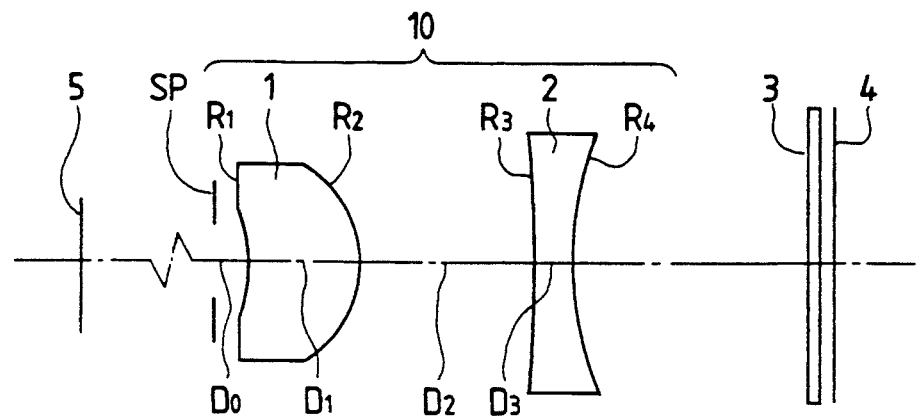
FIG. 1 is a cross-sectional view of the lens of numerical value example 1 of the present invention.
Figure 2:
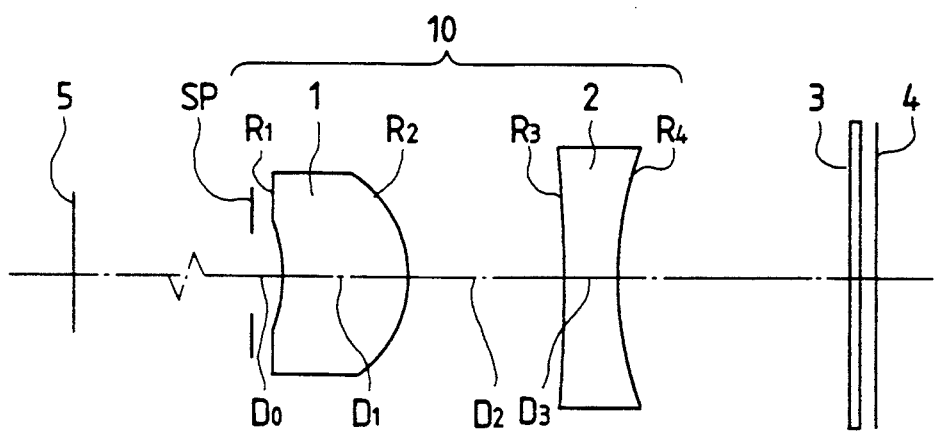
FIG. 2 is a cross-sectional view of the lens of numerical value example 2 of the present invention.
Figure 3:
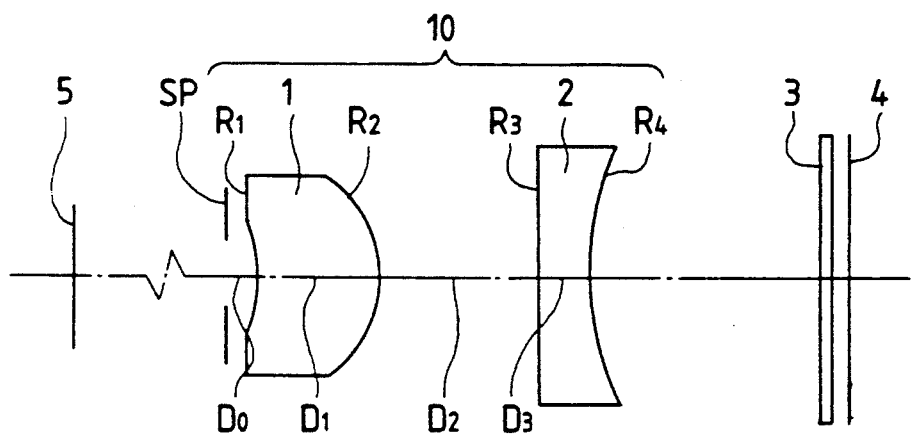
FIG. 3 is a cross-sectional view of the lens of numerical value example 3 of the present invention.
Figure 4:
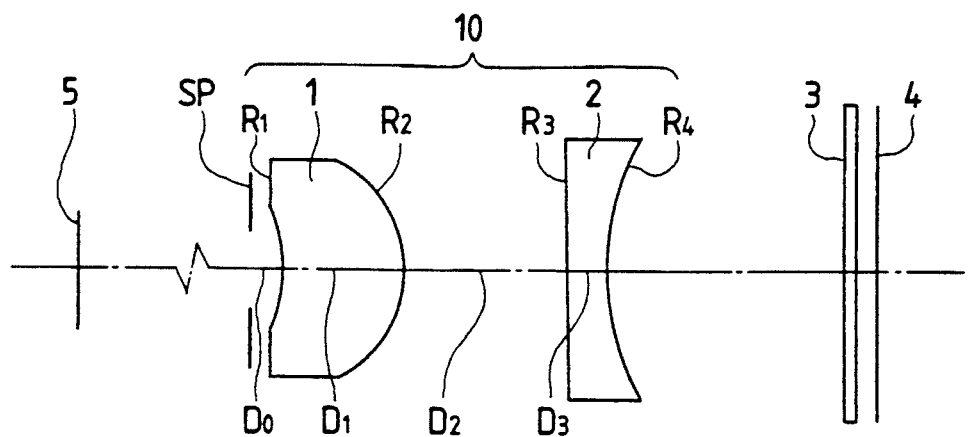
FIG. 4 is a cross-sectional view of the lens of numerical value example 4 of the present invention.
Figure 5:
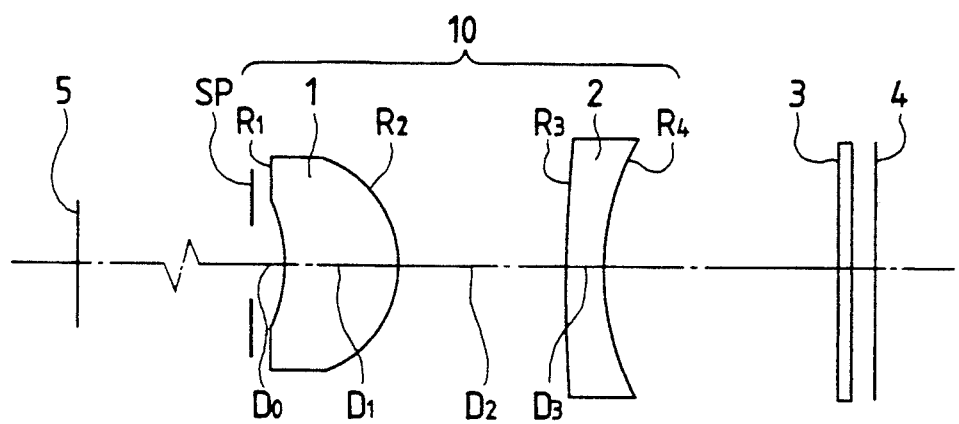
FIG. 5 is a cross-sectional view of the lens of numerical value example 5 of the present invention.
Figure 6:
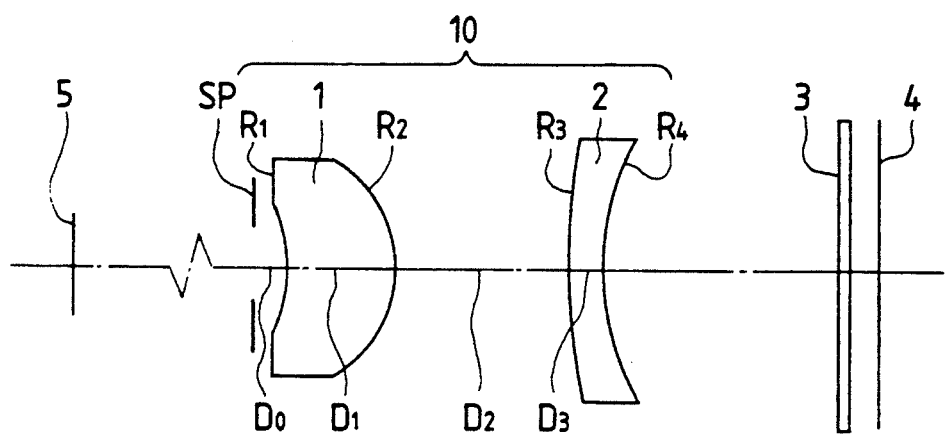
FIG. 6 is a cross-sectional view of the lens of numerical value example 6 of the present invention.
Figure 7:
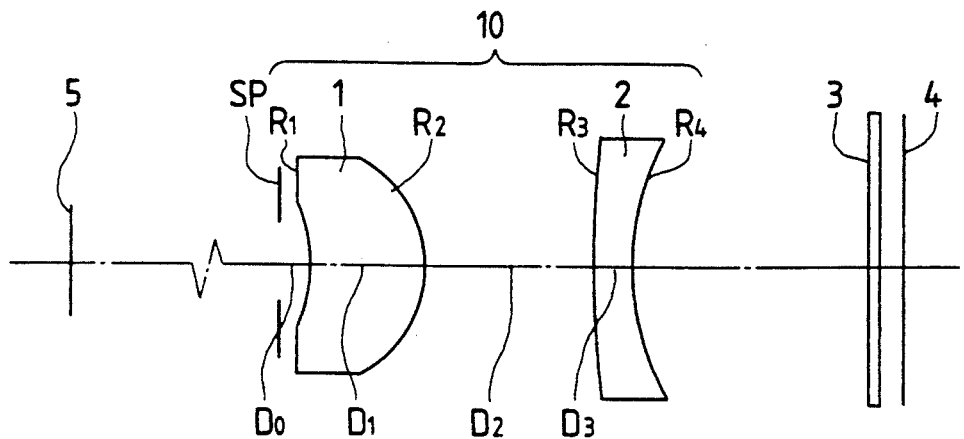
FIG. 7 is a cross-sectional view of the lens of numerical value example 7 of the present invention.
Figure 8:
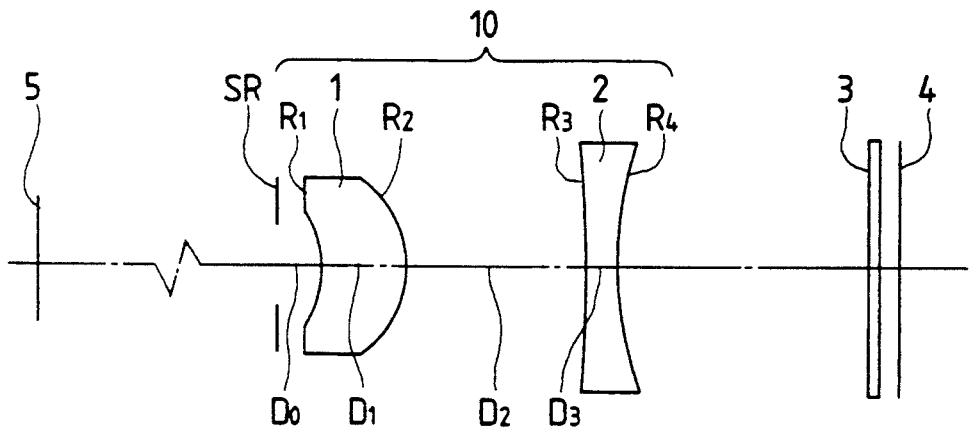
FIG. 8 is a cross-sectional view of the lens of numerical value example 8 of the present invention.
Figure 9:
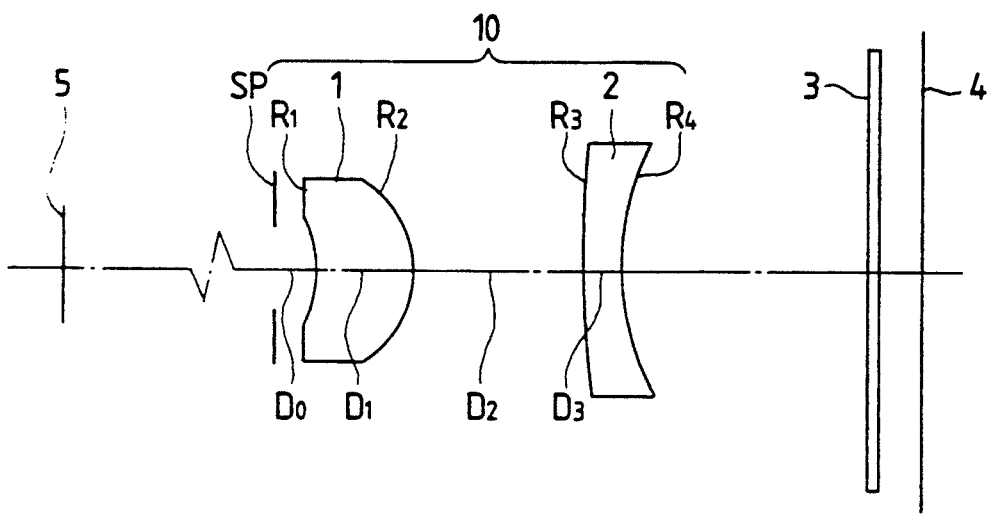
FIG. 9 is a cross-sectional view of the lens of numerical value example 9 of the present invention.
Figure 10:
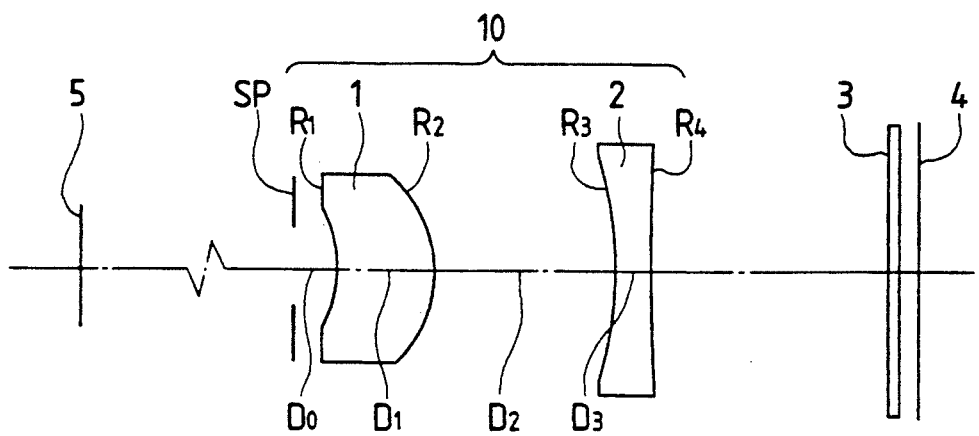
FIG. 10 is a cross-sectional view of the lens of numerical value example 10 of the present invention.
Figure 11:
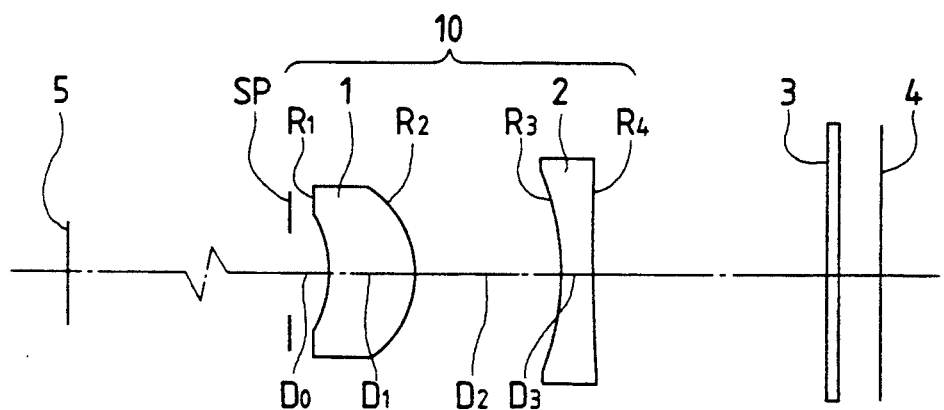
FIG. 11 is a cross-sectional view of the lens of numerical value example 11 of the present invention.
Figure 12:
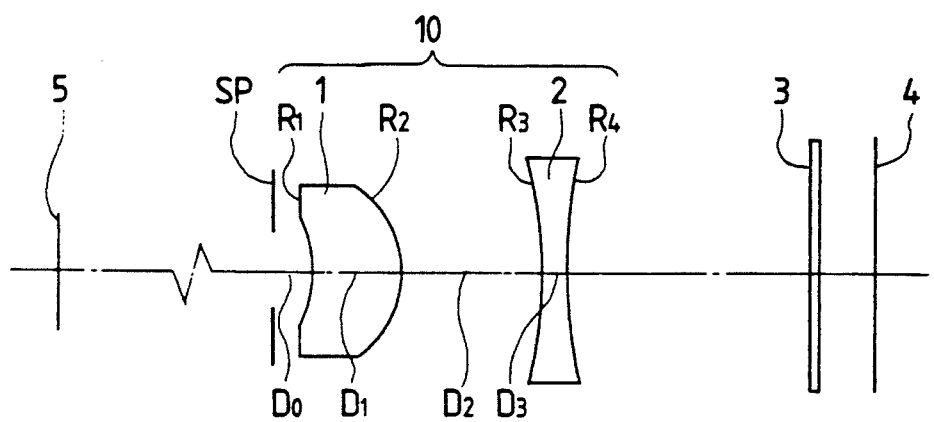
FIG. 12 is a cross-sectional view of the lens of numerical value example 12 of the present invention.
Figure 13:
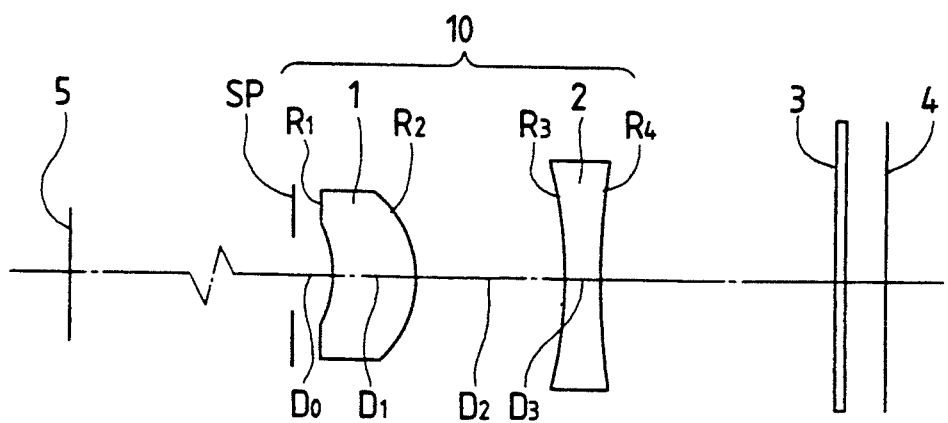
FIG. 13 is a cross-sectional view of the lens of numerical value example 13 of the present invention.
Figure 14:
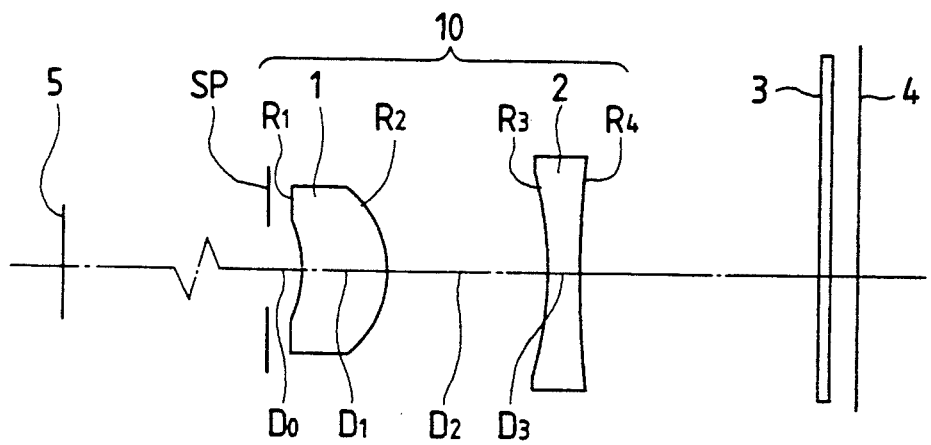
FIG. 14 is a cross-sectional view of the lens of numerical value example 14 of the present invention.
Figure 15:
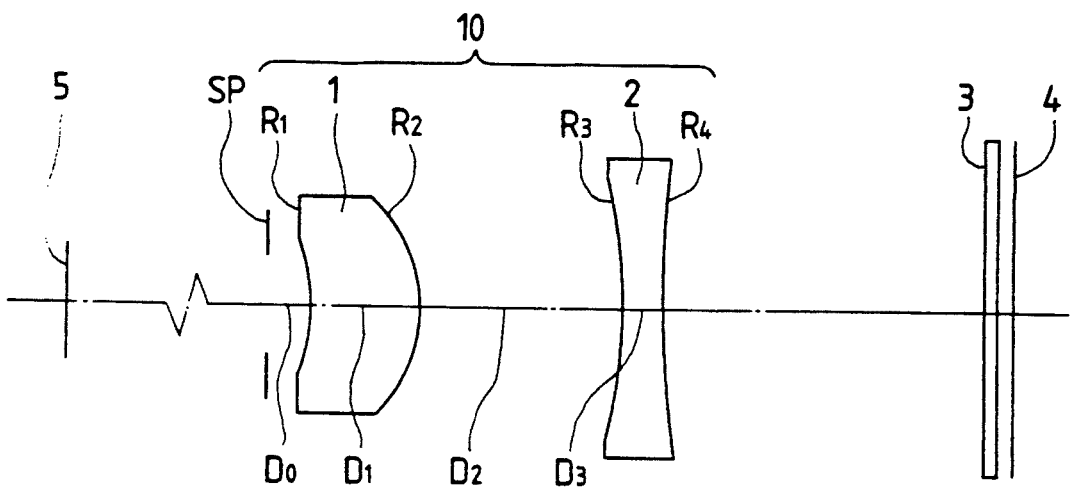
FIG. 15 is a cross-sectional view of the lens of numerical value example 15 of the present invention.
Figures 28A, 28B, 28C, 28D:
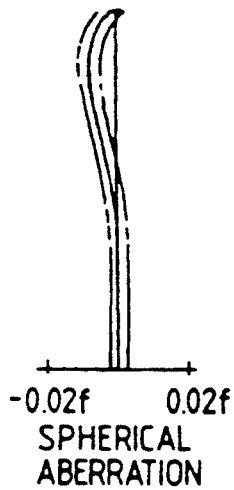
FIGS. 28A-28I show aberrations in numerical value example 13 of the present invention.
Figure 28E:
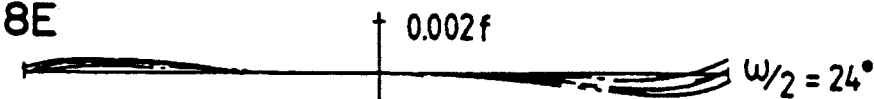
Figure 28F:
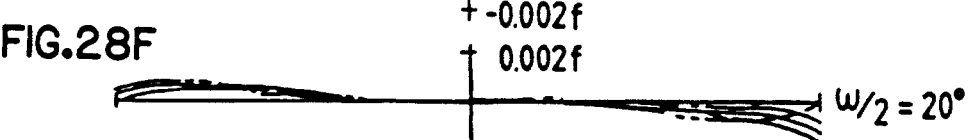
Figure 28G:
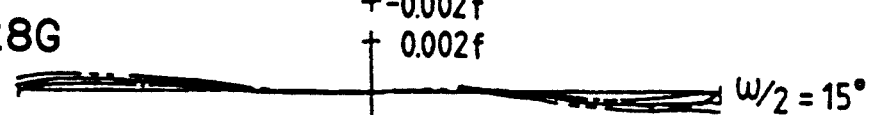
Figure 28H:
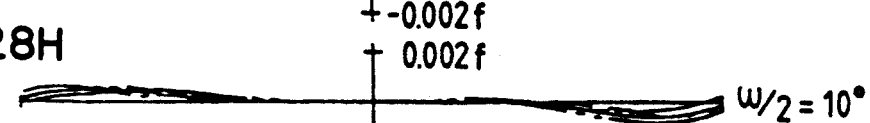
Figure 28I:
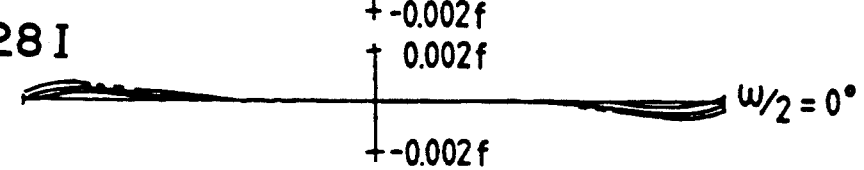

FIGS. 1 to 15 are cross-sectional views of the image reading lenses of numerical value examples 1 to 15 of the present invention, and FIGS. 16A-16I to 30A-30I show aberrations in numerical value examples 1 to 15 of the present invention.

In FIGS. 1 to 15, reference numeral 10 designates an image reading lens, reference numeral 5 denotes image information (object) on the surface of an original, and reference numeral 4 designates reading means located on the image plane of the image reading lens 10 and comprising, for example, a line sensor (CCD) or the like. Reference numeral 3 denotes a transparent substrate (cover glass) for protecting an image recording medium.

The image reading lens 10 comprises two lenses, i.e., a meniscus-shaped positive first lens 1 having its convex surface facing the image plane side (the reduction side) and a negative second lens 2 having its concave surface facing the image plane side, and aspherical surfaces are provided on both the lens surfaces of the first lens 1 and an at least one lens surface of the second lens 2. An aspherical surface of a shape satisfying conditions, which will be described later, is provided on the concave lens surface of the first lens 1 which is adjacent to the object side (the enlargement side).

SP designates a stop provided on the object side of the first lens 1, and the so-called anterior stop type is constituted by this. In the present embodiment, the anterior stop type is adopted, thereby realizing a lens system having a vignetting factor of 100%, and which is not affected by the aberration of the pupil.

The first lens 1, in the present embodiment, is formed by a positive lens of a meniscus shape having its convex surface facing the image plane side and having a shape approximate to a concentric circle relative to the stop SP. Thereby, the image plane characteristic, when a wide angle of view is contrived, is well maintained and yet aberrations, such as spherical aberration and coma, are well corrected.

Also, an aspherical surface is provided on the object side concave lens surface (the first lens surface) of the first lens 1, whereby aberrations such as spherical aberration and coma, created from the image plane side convex lens surface (the second lens surface) of the first lens 1, are well corrected.

The aspherical shape of the first lens surface at this time is formed so as to lie inside a spherical surface formed by a point on the optical axis of the aspherical surface of the lens and an outer peripheral circle provided when the aspherical surface of the lens is cut off by the effective diameter of the lens, i.e., a so-called reference spherical surface.

That is, the aspherical surface is of such a shape that refractive power is loose near the optical axis and refractive power becomes sharper from the optical axis toward the marginal portion of the lens. Thereby, there is obtained a good optical performance in which the half angle of view is as wide as the order of 22° and the F number is as bright as the order of 5.6 and which has a vignetting factor 100%.

In the present embodiment, an aspherical surface is also adopted to the second lens surface of the first lens 1. Thereby, coma created as the angle of view becomes greater is independently corrected by the second lens surface in which the light beam separates from the first lens surface of the first lens 1.

Description will now be made of the optical action of the negative second lens 2, which is disposed on the image plane side of the first lens 1.

Chiefly, a great amount of negative distortion is created from the first lens having positive refractive power and having a concentric shape relative to the stop. Also, chromatic aberration of magnification tends to increase. Also, when the half angle of view expands to the order of 22°, curvature of image field, astigmatism, etc. also are not satisfactorily corrected because of influence of high-order aberrations.

So, in the present embodiment, the lens shape of the second lens 2 having negative refractive power is appropriately set as previously described, whereby aberrations, such as curvature of image field created from the first lens 1 as the angle of view becomes wider, are well corrected.

In particular, the image plane side lens surface (the fourth lens surface) of the second lens 2 is formed with a concave surface, whereby negative distortion created from the first lens 1, is well corrected.

Also, an aspherical surface is provided on at least one lens surface of the second lens 2, whereby the curvature of the image field, and particularly astigmatism are well corrected.

The lens shapes of the first and second lenses 1 and 2 in the present embodiment will now be specifically described by the use of parameters which determine the lens shapes.

When, in the present embodiment, the air gap between the stop SP and the first lens 1 is D0 and the thickness of the first lens 1 is D1 and the air gap between the first lens 1 and the second lens 2 is D2 and the thickness of the second lens 2 is D3 and the radius of curvature of the i-th lens surface is Ri and the refractive index and Abbe number of the material of the first lens 1 are N1d and $\nu$1d, respectively, and the refractive index and Abbe number of the material of the second lens 2 are N2d and $\nu$2d, respectively, and the focal length of the whole lens system is f and the focal length of the first lens 1 is f1 and the focal length of the second lens 2 is f2 and the aspherical amount of the effective ray diameter of the first lens surface of the first lens 1 at N% height from the optical axis is the differential amount from the reference spherical surface toward the optical axis and this differential amount is $\Delta x(N)$ and the maximum value of this differential amount $\Delta x(N)$ is $\Delta x(P)$, the lens shapes and aspherical shapes of the respective lenses are set so as to satisfy the following conditions:

$$0.15 < D2 \times (1/f1 + 1/f2) < 0.3 \quad (1)$$
$$-1.2 < R1/(D0 + N1d \times D1) < -0.8 \quad (2)$$
$$10 < \nu1d - \nu2d \quad (3)$$

$$\left. \begin{array}{l} 0.2 < \Delta x(3)/\Delta x(P) < 0.35 \\ 0.6 < \Delta x(5)/\Delta x(P) < 0.8 \\ 0.6 < \Delta x(9)/\Delta x(P) < 0.8 \end{array} \right\} \quad (4)$$

The technical meanings of the above conditional expressions (1) to (4) will now be described.

Conditional expression (1) is for appropriately setting the air gap between the first lens 1 and the second lens 2 and keeping the optical performance of the entire image field well-balanced.

By conditional expression (1) being satisfied, curvature of image field is well corrected and the first lens 1 and second lens 2 correct aberrations that need to be corrected, that is, the first lens 1 corrects spherical aberration and coma which are the basic imaging function and the second lens 2 corrects astigmatism and distortion concerned with the imaging position.

Conditional expressions (2) and (4) are for appropriately setting the position of the first lens 1 from the stop and the lens shape of the first lens surface and chiefly correcting the image plane characteristic and spherical aberration in a well-balanced manner.

If conditional expression (2) is departed from, then it will become difficult to secure a basic image plane performance that is usable up to a high angle of view. Also, if conditional expression (4) is departed from, then it will become difficult to effectively correct negative spherical aberration and coma created by the second lens surface.

Conditional expression (3) is chiefly for effectively correcting chromatic aberration of magnification by using a material greater in dispersion than that of the first lens as the material of the second lens 2.

If conditional expression (3) is departed from, then it will become difficult to effectively correct the chromatic aberration of magnification created in the first lens 1. Also, substantial thickening of the second lens 2 will result and it will become difficult to effectively correct the chromatic aberration of magnification.

The specific lens shape of the second lens 2 and the other aspherical shapes other than the first lens surface in the present embodiment are appropriately set in conformity with the refractive index of the glass material used in the first lens 1.

When, for example, a material (glass) of relatively low refractive index, of which the refractive index N1d is in the order of N1d < 1.65, is used as the material of the first lens 1, it is preferable that the aforementioned conditional expression (1) be satisfied. The aspherical shape of the fourth lens surface is provided so as to be formed outside the reference spherical surface, that is, be constructed of such a shape that the refractive power is sharp near the optical axis and becomes loose toward the marginal portion, and by the use of the aforementioned parameters, the lens shape of the second lens 2 be set so as to satisfy the following conditions:

$$-0.2/f < 1/R3 < 0.7/f$$
$$0.45 f < R4 < f$$

That is, it is preferable that when a material in low refractive index is used as the material of the first lens 1, the fourth lens surface should be formed by such an aspherical surface that the refractive power is sharp near the optical axis and becomes loose toward the margin of the lens. Thereby, curvature of image field and astigmatism are well corrected and a high optical performance is obtained.

Also, at this time, the aspherical surface of the second lens surface of the first lens 1 is formed so as to be inside the reference spherical surface and a higher optical performance is obtained. That is, the aspherical surface of the second lens surface is formed such that the refractive power is sharp near the optical axis and becomes loose toward the marginal portion of the lens.

Thus, by a material of low refractive index being used as the material in the first lens 1, the curvature of the first lens surface is loosened in the marginal portion of the lens. In addition, the extroversive coma of the light beam; when a high angle of view is contrived, is corrected well.

When a material of relatively high refractive index of which the refractive index N1d is of the order of N1d > 1.65 is used as the material of the first lens 1, the relation of the Petzval sum will vary. Therefore, the lens shape of the second lens 2 tends to secure the basic performance of curvature of image field and astigmatism.

That is, the aforementioned conditional expression (1) is satisfied, and yet the fourth lens surface of the second lens 2 is formed by such an aspherical surface that is inside the reference spherical surface and is set by the use of the aforementioned parameters so as to satisfy the following conditions:

$$-1.5 f < R3 < -0.5 f$$
$$f < R4$$

Thereby, aberrations such as curvature of image field, astigmatism, distortion and chromatic aberration of magnification are well corrected.

Also, at this time, the aspherical surface of the second lens surface of the first lens 1 is formed so as to be outside the reference spherical surface to thereby obtain a higher optical performance. That is, a material of which the refractive index N1d is high, is used as the material of the first lens 1 and the curvature of the aspherical surface is made loose to thereby effectively correct introversive coma created when a high angle of view is contrived.

The image reading lens of the present invention can be made by molding or injection-molding an inexpensive material of low refractive index, whereby a predetermined aspherical surface is obtained easily.

In the present embodiment, the lens shape and aspherical surface coefficient of the image reading lens are appropriately set, whereby the making of the aspherical shape is made easy so that a highly accurate aspherical shape approximate to the design value can be obtained easily, thereby enabling image information on the surface of an original to be read with high accuracy.

The numerical value examples of the present invention will now be shown. In the numerical value examples, Ri is the radius of curvature of the i-th lens surface from the object side, Di is the thickness and air gap of the i-th lens from the objective side, and Nid and νid are the refractive index and Abbe number, respectively, of the glass of the i-th lens from the object side.

In the numerical value examples, the focal length f is normalized as f = 1.0. Also, the half angle of view is 24°, F number is 5.6, the cover glass 3 has a plate thickness of about 0.024, and the refractive index of the material is 1.52.

In actual use, the focal length f of each example is in the order of 29 mm, and an image reading apparatus having a high optical performance is realized which can read the image of an original of size B4 and the image of an original of size A3, with resolving power of scanning line density 8 pel/mm, at an imaging magnification $\beta = -0.112$ time and an imaging magnification $\mu = 0.088$ time, respectively, if use is made of a CCD of arrangement pitch 14 $\mu$m and a CCD of arrangement pitch 11 $\mu$m.

Also, when the direction perpendicular to the optical axis is the H-axis and the direction of travel of light is positive and Ri is the paraxial radius of curvature and k, B, C, D and E are aspherical surface coefficients, the aspherical shape is represented by the following equation:

$$X = h^2/Ri/(1 + \sqrt{1 - (1+k)h^2/Ri^2} + $$

$$Bh^4 + Ch^6 + Dh^8 + Eh^{10}$$

Also, in the numerical value examples, R0i represents the radius of curvature of the reference spherical surface on the i-th lens surface from the object side, and EAi represents the then effective diameter.

Also, the lens cross-sectional view and aberration graph of each example show a case where the imaging magnification is $\beta = -0.112$ time. The relations between the aforementioned conditional expressions and the numerical values in the numerical value examples are shown in tables below.

As shown in each aberration graph, in any embodiment of the present invention, good aberration correction is done at a vignetting factor 100% for all angles of view.

By the lens shape and aspherical shape of the image reading lens being appropriately set, there is provided an image reading lens having a high optical performance over the entire image field. Numerical Value Example 1

| Numerical Value Example 1 | | | | | | |
|---|---|---|---|---|---|---|
| | | | D0 = 0.0790 | | | |
| EA1 = 0.234 | R01 = −0.4043 | R1 = −0.5022 | D1 = 0.2708 | N1d = 1.58913 | $\nu$1d = 61.3 | |
| EA2 = 0.405 | R02 = −0.2721 | R2 = −0.2666 | D2 = 0.4090 | | | |
| | | R3 = −3.4433 | D3 = 0.0996 | N2d = 1.58520 | $\nu$2d = 30.6 | |
| EA4 = 0.550 | R04 = 0.8559 | R4 = 0.7838 | | | | |

| Aspherical surface coefficient | Surface R1 | Surface R2 | Surface R4 |
|---|---|---|---|
| k | −1 | 0 | 0 |
| B | −1.499 × 10$^{+1}$ | 1.429 × 10$^{+0}$ | −9.104 × 10$^{-1}$ |
| C | −6.879 × 10$^{+1}$ | 5.119 × 10$^{+0}$ | 8.569 × 10$^{-1}$ |
| D | −2.138 × 10$^{+4}$ | 2.537 × 10$^{+1}$ | 2.259 × 10$^{+1}$ |
| E | 1.365 × 10$^{+5}$ | 2.830 × 10$^{+2}$ | −1.411 × 10$^{+2}$ |

| Numerical Value Example 2 | | | | | | |
|---|---|---|---|---|---|---|
| | | | D0 = 0.0754 | | | |
| EA1 = 0.233 | R01 = −0.4608 | R1 = −0.5589 | D1 = 0.3036 | N1d = 1.58913 | $\nu$1d = 61.3 | |
| EA2 = 0.417 | R02 = −0.2863 | R2 = −0.2760 | D2 = 0.3849 | | | |
| | | R3 = −5.7899 | D3 = 0.1208 | N2d = 1.58520 | $\nu$2d = 30.6 | |
| EA4 = 0.540 | R04 = 0.7320 | R4 = 0.6640 | | | | |

| Aspherical surface coefficient | Surface R1 | Surface R2 | Surface R4 |
|---|---|---|---|
| k | −1 | 0 | 0 |
| B | −1.257 × 10$^{+1}$ | 1.916 × 10$^{+0}$ | −1.165 × 10$^{+0}$ |
| C | −1.600 × 10$^{+2}$ | 1.337 × 10$^{+1}$ | −1.850 × 10$^{+0}$ |
| D | −5.650 × 10$^{+3}$ | −1.934 × 10$^{+2}$ | 7.436 × 10$^{+1}$ |
| E | 1.701 × 10$^{+5}$ | 6.471 × 10$^{+3}$ | −4.614 × 10$^{+2}$ |

| Numerical Value Example 3 | | | | | | |
|---|---|---|---|---|---|---|
| | | | D0 = 0.0722 | | | |
| EA1 = 0.230 | R01 = −0.4586 | R1 = −0.5565 | D1 = 0.3010 | N1d = 1.58313 | $\nu$1d = 59.4 | |
| EA2 = 0.413 | R02 = −0.2853 | R2 = −0.2751 | D2 = 0.3833 | | | |
| | | R3 = −29.1300 | D3 = 0.1196 | N2d = 1.58520 | $\nu$2d = 30.6 | |
| EA4 = 0.542 | R04 = 0.6883 | R4 = 0.6229 | | | | |

| Aspherical surface coefficient | Surface R1 | Surface R2 | Surface R4 |
|---|---|---|---|
| k | −1 | 0 | 0 |
| B | −1.239 × 10$^{+1}$ | 1.925 × 10$^{+0}$ | −1.450 × 10$^{+0}$ |
| C | −1.607 × 10$^{+2}$ | 1.524 × 10$^{+1}$ | 3.374 × 10$^{+0}$ |
| D | −9.790 × 10$^{+3}$ | −2.177 × 10$^{+2}$ | 2.082 × 10$^{+0}$ |

-continued

| | | | |
|---|---|---|---|
| E | $1.712 \times 10^{+5}$ | $6.528 \times 10^{+3}$ | $-9.327 \times 10^{+2}$ |

Numerical Value Example 4

| | | | D0 = 0.0760 | | |
|---|---|---|---|---|---|
| EA1 = 0.232 | R01 = −0.4310 | R1 = −0.5226 | D1 = 0.2919 | N1d = 1.58913 | ν1d = 61.3 |
| EA2 = 0.412 | R02 = −0.2825 | R2 = −0.2732 | D2 = 0.3978 | | |
| | | R3 = 15.4914 | D3 = 0.1030 | N2d = 1.58520 | ν2d = 30.6 |
| EA4 = 0.544 | R04 = 0.6723 | R4 = 0.6111 | | | |

| Aspherical surface coefficient | Surface R1 | Surface R2 | Surface R4 |
|---|---|---|---|
| k | −1 | 0 | 0 |
| B | $-1.307 \times 10^{+1}$ | $1.846 \times 10^{+0}$ | $-1.287 \times 10^{+0}$ |
| C | $-1.683 \times 10^{+2}$ | $1.184 \times 10^{+1}$ | $-2.501 \times 10^{+0}$ |
| D | $-1.003 \times 10^{+4}$ | $-1.836 \times 10^{+2}$ | $8.182 \times 10^{+1}$ |
| E | $1.763 \times 10^{+5}$ | $6.591 \times 10^{+3}$ | $-3.484 \times 10^{+2}$ |

Numerical Value Example 5

| | | | D0 = 0.0788 | | |
|---|---|---|---|---|---|
| EA1 = 0.233 | R01 = −0.3881 | R1 = −0.4717 | D1 = 0.2672 | N1d = 1.58913 | ν1d = 61.3 |
| EA2 = 0.403 | R02 = −0.2729 | R2 = −0.2666 | D2 = 0.4077 | | |
| | | R3 = 2.9163 | D3 = 0.0959 | N2d = 1.58520 | ν2d = 30.6 |
| EA4 = 0.546 | R04 = 0.6261 | R4 = 0.5661 | | | |

| Aspherical surface coefficient | Surface R1 | Surface R2 | Surface R4 |
|---|---|---|---|
| k | −1 | 0 | 0 |
| B | $-1.443 \times 10^{+1}$ | $1.566 \times 10^{+0}$ | $-1.501 \times 10^{+0}$ |
| C | $-2.037 \times 10^{+2}$ | $4.976 \times 10^{+0}$ | $2.893 \times 10^{+0}$ |
| D | $-9.783 \times 10^{+3}$ | $-1.028 \times 10^{+1}$ | $-9.733 \times 10^{+0}$ |
| E | $-2.374 \times 10^{+5}$ | $2.721 \times 10^{+3}$ | $-3.530 \times 10^{+1}$ |

Numerical Value Example 6

| | | | D0 = 0.0765 | | |
|---|---|---|---|---|---|
| EA1 = 0.231 | R01 = −0.3893 | R1 = −0.4659 | D1 = 0.2697 | N1d = 1.58913 | ν1d = 61.3 |
| EA2 = 0.402 | R02 = −0.2748 | R2 = −0.2673 | D2 = 0.4116 | | |
| | | R3 = 1.8504 | D3 = 0.0854 | N2d = 1.58520 | ν2d = 30.6 |
| EA4 = 0.546 | R04 = 0.5801 | R4 = 0.5204 | | | |

| Aspherical surface coefficient | Surface R1 | Surface R2 | Surface R4 |
|---|---|---|---|
| k | −1 | 0 | 0 |
| B | $-1.404 \times 10^{+1}$ | $1.717 \times 10^{+0}$ | $-1.611 \times 10^{+0}$ |
| C | $-1.935 \times 10^{+2}$ | $8.927 \times 10^{+0}$ | $-2.942 \times 10^{+0}$ |
| D | $-1.047 \times 10^{+3}$ | $-1.677 \times 10^{+2}$ | $7.261 \times 10^{+1}$ |
| E | $1.857 \times 10^{+5}$ | $6.694 \times 10^{+3}$ | $-5.097 \times 10^{+2}$ |

Numerical Value Example 7

| | | | D0 = 0.0764 | | |
|---|---|---|---|---|---|
| EA1 = 0.232 | R01 = −0.4087 | R1 = −0.4924 | D1 = 0.2809 | N1d = 1.58913 | ν1d = 61.3 |
| EA2 = 0.408 | R02 = −0.2790 | R2 = −0.2707 | D2 = 0.4058 | | |
| | | R3 = 3.3138 | D3 = 0.0959 | N2d = 1.58520 | ν2d = 30.6 |
| EA4 = 0.546 | R04 = 0.6266 | R4 = 0.5644 | | | |

| Aspherical surface coefficient | Surface R1 | Surface R2 | Surface R4 |
|---|---|---|---|
| k | −1 | 0 | 0 |
| B | $-1.352 \times 10^{+1}$ | $1.767 \times 10^{+0}$ | $-1.426 \times 10^{+0}$ |
| C | $-1.793 \times 10^{+2}$ | $1.043 \times 10^{+1}$ | $-2.710 \times 10^{+0}$ |
| D | $-1.023 \times 10^{+3}$ | $-1.782 \times 10^{+2}$ | $7.774 \times 10^{+1}$ |
| E | $1.805 \times 10^{+5}$ | $6.586 \times 10^{+3}$ | $-5.128 \times 10^{+2}$ |

Numerical Value Example 8

| | | | D0 = 0.0951 | | |
|---|---|---|---|---|---|
| EA1 = 0.240 | R01 = −0.2954 | R1 = −0.3880 | D1 = 0.2032 | N1d = 1.58913 | νd = 61.3 |
| EA2 = 0.377 | R02 = −0.2082 | R2 = −0.2363 | D2 = 0.4081 | | |
| | | R3 = −4.6258 | D3 = 0.0748 | N2d = 1.5852 | ν2d = 30.6 |
| EA4 = 0.533 | R04 = 0.8773 | R4 = 0.8102 | | | |

| Aspherical surface coefficient | Surface R1 | Surface R2 | Surface R4 |
|---|---|---|---|
| k | −1 | 0 | 0 |
| B | $-2.239 \times 10^{+1}$ | $6.923 \times 10^{+1}$ | $-9.441 \times 10^{-1}$ |
| C | $-2.173 \times 10^{+2}$ | $-4.991 \times 10^{+1}$ | $5.833 \times 10^{+0}$ |
| D | $-2.532 \times 10^{+4}$ | $1.866 \times 10^{+3}$ | $-5.281 \times 10^{+1}$ |
| E | $-8.663 \times 10^{+5}$ | $-5.144 \times 10^{+3}$ | $2.170 \times 10^{+2}$ |

Numerical Value Example 9

| | | | D0 = 0.0912 | | |
|---|---|---|---|---|---|
| EA1 = 0.239 | R01 = −0.3309 | R1 = −0.4139 | D1 = 0.2285 | N1d = 1.58913 | νd = 61.3 |
| EA2 = 0.390 | R02 = −0.2527 | R2 = −0.2502 | D2 = 0.3890 | | |
| | | R3 = 2.3136 | D3 = 0.0924 | N2d = 1.58520 | ν2d = 30.6 |
| EA4 = 0.535 | R04 = 0.6292 | R4 = 0.5677 | | | |

| Aspherical surface coefficient | Surface R1 | Surface R2 | Surface R4 |
|---|---|---|---|
| k | −1 | 0 | 0 |
| B | $-1.818 \times 10^{+1}$ | $1.231 \times 10^{+0}$ | $-1.548 \times 10^{+0}$ |
| C | $-1.037 \times 10^{+2}$ | $-3.172 \times 10^{+0}$ | $1.745 \times 10^{+0}$ |
| D | $-2.577 \times 10^{+4}$ | $1.638 \times 10^{+2}$ | $8.324 \times 10^{+0}$ |
| E | $3.118 \times 10^{+3}$ | $-6.436 \times 10^{+3}$ | $-1.104 \times 10^{+2}$ |

Numerical Value Example 10

| | | | D0 = 0.0928 | | |
|---|---|---|---|---|---|
| EA1 = 0.244 | R01 = −0.3722 | R1 = −0.4857 | D1 = 0.2282 | N1d = 1.69680 | νd = 55.5 |
| EA2 = 0.394 | R02 = −0.2707 | R2 = −0.2806 | D2 = 0.4264 | | |
| | | R3 = −0.7480 | D3 = 0.0721 | N2d = 1.68893 | ν2d = 31.1 |
| EA4 = 0.529 | R04 = 6.8176 | R4 = 10.8989 | | | |

| Aspherical surface coefficient | Surface R1 | Surface R2 | Surface R4 |
|---|---|---|---|
| k | −1 | 0 | 0 |
| B | $-1.596 \times 10^{+1}$ | $-9.947 \times 10^{-1}$ | $4.792 \times 10^{-1}$ |
| C | $-3.525 \times 10^{+2}$ | $-3.613 \times 10^{+1}$ | $-3.732 \times 10^{+0}$ |
| D | $-8.137 \times 10^{+3}$ | $2.616 \times 10^{+2}$ | $7.426 \times 10^{+1}$ |
| E | $-1.891 \times 10^{+5}$ | $-1.379 \times 10^{+4}$ | $-5.512 \times 10^{+2}$ |

Numerical Value Example 11

| | | | D0 = 0.0845 | | |
|---|---|---|---|---|---|
| EA1 = 0.235 | R01 = −0.3519 | R1 = −0.4703 | D1 = 0.2022 | N1d = 1.69350 | νd = 53.3 |
| EA2 = 0.369 | R02 = −0.2532 | R2 = −0.2666 | D2 = 0.3576 | | |
| | | R3 = −0.6750 | D3 = 0.0743 | N2d = 1.58600 | ν2d = 31.0 |
| EA4 = 0.492 | R04 = 3.6379 | R4 = 5.4184 | | | |

| Aspherical surface coefficient | Surface R1 | Surface R2 | Surface R4 |
|---|---|---|---|
| k | −1 | 0 | 0 |
| B | $-1.984 \times 10^{+1}$ | $-1.897 \times 10^{+0}$ | $8.329 \times 10^{-1}$ |
| C | $-2.435 \times 10^{+2}$ | $-7.325 \times 10^{+1}$ | $-7.557 \times 10^{-1}$ |
| D | $-2.102 \times 10^{+4}$ | $1.473 \times 10^{+3}$ | $-6.544 \times 10^{+0}$ |
| E | $-6.634 \times 10^{+5}$ | $-5.582 \times 10^{+4}$ | $-6.825 \times 10^{+1}$ |

Numerical Value Example 12

| | | | D0 = 0.0859 | |
|---|---|---|---|---|
| EA1 = 0.236 | R01 = −0.3269 | R1 = −0.4295 | D1 = 0.2048 | N1d = 1.69350 νd = 53.3 |
| EA2 = 0.375 | R02 = −0.2500 | R2 = −0.2587 | D2 = 0.3407 | |

-continued

| | | R3 = −1.1056 | D3 = 0.0669 | N2d = 1.58600 | ν2d = 31.0 |
|---|---|---|---|---|---|
| EA4 = 0.494 | R04 = 1.3973 | R4 = 1.4197 | | | |

| Aspherical surface coefficient | Surface R1 | Surface R2 | Surface R4 |
|---|---|---|---|
| k | −1 | 0 | 0 |
| B | $-2.083 \times 10^{+1}$ | $-9.552 \times 10^{-1}$ | $6.369 \times 10^{-2}$ |
| C | $-1.669 \times 10^{+2}$ | $-5.559 \times 10^{+1}$ | $2.786 \times 10^{+0}$ |
| D | $-2.418 \times 10^{+4}$ | $1.430 \times 10^{+3}$ | $-6.218 \times 10^{+1}$ |
| E | $-8.202 \times 10^{+5}$ | $-5.166 \times 10^{+4}$ | $4.072 \times 10^{+2}$ |

Numerical Value Example 13

| | | | D0 = 0.0870 | | |
|---|---|---|---|---|---|
| EA1 = 0.237 | R01 = −0.3371 | R1 = −0.4435 | D1 = 0.2033 | N1d = 1.69350 | ν1d = 53.3 |
| EA2 = 0.373 | R02 = −0.2532 | R2 = −0.2642 | D2 = 0.3638 | | |
| | | R3 = −0.8979 | D3 = 0.0748 | N2d = 1.58600 | ν2d = 31.0 |
| EA4 = 0.501 | R04 = 1.9651 | R4 = 2.1864 | | | |

| Aspherical surface coefficient | Surface R1 | Surface R2 | Surface R4 |
|---|---|---|---|
| k | −1 | 0 | 0 |
| B | $-1.976 \times 10^{+1}$ | $-1.341 \times 10^{+0}$ | $3.563 \times 10^{-1}$ |
| C | $-2.346 \times 10^{+2}$ | $-6.749 \times 10^{+1}$ | $3.945 \times 10^{+0}$ |
| D | $-2.023 \times 10^{+4}$ | $1.505 \times 10^{+3}$ | $-6.894 \times 10^{+1}$ |
| E | $-6.310 \times 10^{+5}$ | $-5.157 \times 10^{+4}$ | $3.340 \times 10^{+2}$ |

Numerical Value Example 14

| | | | D0 = 0.0736 | | |
|---|---|---|---|---|---|
| EA1 = 0.227 | R01 = −0.3581 | R1 = −0.4572 | D1 = 0.2043 | N1d = 1.69350 | ν1d = 53.3 |
| EA2 = 0.361 | R02 = −0.2580 | R2 = −0.2694 | D2 = 0.3880 | | |
| | | R3 = −0.7770 | D3 = 0.0750 | N2d = 1.58600 | ν2d = 31.0 |
| EA4 = 0.504 | R04 = 2.8069 | R4 = 3.5789 | | | |

| Aspherical surface coefficient | Surface R1 | Surface R2 | Surface R4 |
|---|---|---|---|
| k | −1 | 0 | 0 |
| B | $-1.903 \times 10^{+1}$ | $-1.517 \times 10^{+0}$ | $7.041 \times 10^{-1}$ |
| C | $-1.800 \times 10^{+2}$ | $-7.569 \times 10^{+1}$ | $-2.084 \times 10^{+0}$ |
| D | $-2.374 \times 10^{+4}$ | $1.732 \times 10^{+3}$ | $1.968 \times 10^{+1}$ |
| E | $-4.939 \times 10^{+5}$ | $-5.412 \times 10^{+4}$ | $-1.685 \times 10^{+2}$ |

Numerical Value Example 15

| | | | D0 = 0.0789 | | |
|---|---|---|---|---|---|
| EA1 = 0.232 | R01 = −0.3678 | R1 = −0.4724 | D1 = 0.2120 | N1d = 1.69350 | ν1d = 53.3 |
| EA2 = 0.371 | R02 = −0.2629 | R2 = −0.2735 | D2 = 0.3812 | | |
| | | R3 = −0.8732 | D3 = 0.0752 | N2d = 1.58600 | ν2d = 31.0 |
| EA4 = 0.506 | R04 = 2.0204 | R4 = 2.3425 | | | |

| Aspherical surface coefficient | Surface R1 | Surface R2 | Surface R4 |
|---|---|---|---|
| k | −1 | 0 | 0 |
| B | $-1.894 \times 10^{+1}$ | $-1.276 \times 10^{+0}$ | $6.238 \times 10^{-1}$ |
| C | $1.244 \times 10^{+2}$ | $-5.414 \times 10^{+1}$ | $-1.344 \times 10^{+0}$ |
| D | $-4.576 \times 10^{+4}$ | $1.194 \times 10^{+3}$ | $-1.004 \times 10^{+1}$ |
| E | $2.235 \times 10^{+5}$ | $-4.240 \times 10^{+4}$ | $1.541 \times 10^{+2}$ |

| Conditional expressions | Numerical value examples | | | | | | | |
|---|---|---|---|---|---|---|---|---|
| | 1 | 2 | 3 | 4 | 5 | 6 | 7 | 8 |
| (1) D2 × (1/f1 + 1/f2) | 0.2265 | 0.2004 | 0.2042 | 0.2218 | 0.2464 | 0.2562 | 0.2397 | 0.2471 |
| (2) R1/(D0 + N1d × D1) | −0.9857 | −1.0016 | −1.0140 | −0.9678 | −0.9368 | −0.9222 | −0.9419 | −0.9281 |
| (4) Δ x3/Δx (P) | 0.282 | 0.301 | 0.293 | 0.293 | 0.287 | 0.292 | 0.292 | 0.262 |
| Δ x5/Δx (P) | 0.679 | 0.712 | 0.699 | 0.698 | 0.688 | 0.697 | 0.698 | 0.644 |
| Δ x9/Δx (P) | 0.690 | 0.651 | 0.666 | 0.666 | 0.679 | 0.667 | 0.667 | 0.730 |
| P | 0.740 | 0.758 | 0.730 | 0.732 | 0.735 | 0.731 | 0.730 | 0.757 |

-continued

| Conditional expressions | Numerical value examples | | | | | | |
|---|---|---|---|---|---|---|---|
| | 9 | 10 | 11 | 12 | 13 | 14 | 15 |
| (1) D2 × (1/f1 + 1/f2) | 0.2528 | 0.2305 | 0.2157 | 0.2170 | 0.2270 | 0.2343 | 0.2302 |
| (2) R1/(D0 + N1d × D1) | −0.9110 | −1.0117 | −1.1015 | −0.9924 | −1.0280 | −1.0896 | −1.0785 |
| (4) Δx3/Δx (P) | 0.274 | 0.276 | 0.269 | 0.266 | 0.269 | 0.275 | 0.272 |
| Δx5/Δx (P) | 0.665 | 0.672 | 0.657 | 0.651 | 0.656 | 0.666 | 0.661 |
| Δx9/Δx (P) | 0.705 | 0.694 | 0.716 | 0.724 | 0.717 | 0.708 | 0.712 |
| P | 0.747 | 0.742 | 0.751 | 0.754 | 0.751 | 0.747 | 0.750 |

According to the present invention, as previously described above, there can be achieved an image reading lens of simple construction in which the lens construction including the lens shape and the aspherical shape is appropriately set, whereby image information on the surface of an original, which is illuminated by a light beam from illuminating means such as an LED array, can be read with aberrations corrected in a well-balanced manner and with a high optical performance.

What is claimed is:

1. An image reading lens comprising, in succession from the object side, a stop, a meniscus-shaped positive first lens having its convex surface at the image plane side, and a negative second lens having its concave surface at the image plane side, the both lens surfaces of said first lens and at least one lens surface of said second lens each comprising an aspherical surface, the shape of the object side aspherical surface of said first lens being formed so as to be inside a reference spherical surface.

2. An image reading lens according to claim 1, satisfying the following conditions:

$$0.15 < D2 \times (1/f1 + 1/f2) < 0.3$$
$$-1.2 < R1/(D0 + N1d \times D1) < -0.8$$
$$10 < \nu 1d - \nu 2d$$

where D0 is the air gap between said stop and said first lens, D1 is the thickness of said first lens, D2 is the air gap between said first lens and said second lens, R1 is the paraxial radius of curvature of the object side aspherical surface of said first lens, N1d and $\nu$1d are the refractive index and Abbe number, respectively, of the material of said first lens, $\nu$2d is the Abbe number of the material of said second lens, and f1 and f2 are the focal lengths of said first lens and said second lens, respectively, and wherein when the differential amount of the aspherical surface from the reference spherical surface toward the optical axis at N% height from the optical axis of an effective ray diameter is Δx(N) and the maximum value of said differential amount Δx(N) is Δx(P), the aspherical shape of the object side lens surface of said first lens satisfies the following conditions:

$$0.2 < \Delta x(3)/\Delta x(P) < 0.35$$
$$0.6 < \Delta x(5)/\Delta x(P) < 0.8$$
$$0.6 < \Delta x(9)/\Delta x(P) < 0.8$$
$$6.5 < P < 8.5.$$

3. An image reading lens according to claim 2, wherein when the radii of curvature of the object side and image plane side lens surfaces of said second lens are R3 and R4, respectively, the focal length of the whole system is f and the refractive index N1d of the material of said first lens is N1d < 1.65, the image plane side lens surface of said second lens is an aspherical surface, and said aspherical surface is formed so as to be outside the reference spherical surface, and satisfies the following conditions:

$$-0.2/f < 1/R3 < 0.7/f$$
$$0.45 f < R4 < f.$$

4. An image reading lens according to claim 2, wherein when the radii of curvature of the object side and image plane side lens surfaces of said second lens are R3 and R4, respectively, the focal length of the whole system is f and the refractive index N1d of the material of said first lens is N1d > 1.65, the image plane side lens surface of said second lens is an aspherical surface, and said aspherical surface is formed so as to be inside the reference spherical surface, and satisfies the following conditions:

$$-1.5 f < R3 < -0.5 f$$
$$f < R4.$$

5. An image reading lens according to claim 3, wherein the image plane side aspherical surface of said first lens is formed so as to be inside the reference spherical surface.

6. An image reading lens according to claim 4, wherein the image plane side aspherical surface of said first lens is formed so as to be outside the reference spherical surface.

* * * * *

UNITED STATES PATENT AND TRADEMARK OFFICE
CERTIFICATE OF CORRECTION

PATENT NO. : 5,329,403
DATED : July 12, 1994
INVENTOR(S) : MOTOMU FUKASAWA

It is certified that error appears in the above-indentified patent and that said Letters Patent is hereby corrected as shown below:

<u>ON COVER PAGE</u>:

<u>At [56] Under Heading "FOREIGN PATENT DOCUMENTS"</u>:
"89128028  5/1989 JAPAN
163509    7/1991 JAPAN" should read
--89-128028  5/1989 Japan
  63-509     7/1991 Japan--.

<u>COLUMN 3</u>:
    Line 40,    "an" should read --on--.

<u>COLUMN 4</u>:
    Line 11,    "factor 100%." should read --factor of 100%.--.
    Line 37,    "distortion" should read --distortion,--.

<u>COLUMN 5</u>:
    Line 60     "be" should read --is--.

<u>COLUMN 8</u>:
    Line 17,    "factor 100%" should read --factor of 100%--.

Signed and Sealed this

Third Day of January, 1995

Attest:

BRUCE LEHMAN

*Attesting Officer*    *Commissioner of Patents and Trademarks*